(12) United States Patent
Shoji et al.

(10) Patent No.: US 11,143,734 B2
(45) Date of Patent: Oct. 12, 2021

(54) TRACKING RECEIVER, ANTENNA APPARATUS, AND TRACKING METHOD

(71) Applicant: Mitsubishi Electric Corporation, Chiyoda-ku (JP)

(72) Inventors: Takanori Shoji, Chiyoda-ku (JP); Kenji Komai, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 17/049,213

(22) PCT Filed: Apr. 19, 2019

(86) PCT No.: PCT/JP2019/016824
§ 371 (c)(1),
(2) Date: Oct. 20, 2020

(87) PCT Pub. No.: WO2019/208434
PCT Pub. Date: Oct. 31, 2019

(65) Prior Publication Data
US 2021/0239782 A1 Aug. 5, 2021

(30) Foreign Application Priority Data
Apr. 27, 2018 (JP) .............................. JP2018-086573

(51) Int. Cl.
*G01S 3/42* (2006.01)
(52) U.S. Cl.
CPC ...................... *G01S 3/42* (2013.01)
(58) Field of Classification Search
CPC ... G01S 3/42; G01S 3/065; G01S 1/02; G01S 5/04; G01S 5/12; H01Q 7/00
(Continued)

(56) References Cited

U.S. PATENT DOCUMENTS

| 4,994,810 A | 2/1991 | Sinsky |
| 6,937,186 B1 * | 8/2005 | Dybdal ..................... G01S 3/22 342/147 |

(Continued)

FOREIGN PATENT DOCUMENTS

| JP | 57-93267 | 6/1982 |
| JP | 5-84884 U | 11/1993 |

(Continued)

OTHER PUBLICATIONS

Office Action dated Sep. 3, 2019 in Japanese Application No. 2019-537321 (w/computer-generated English translation).

(Continued)

*Primary Examiner* — Harry K Liu
(74) *Attorney, Agent, or Firm* — Oblon, McClelland, Maier & Neustadt, L.L.P.

(57) ABSTRACT

A tracking receiver includes: a complex sum signal generator to generate a complex sum signal; a complex difference signal generator to generate a complex difference signal; a first correction coefficient storage to store a first correction coefficient represented by a complex number; complex difference signal correcting circuitry to calculate a corrected complex difference signal by correcting the complex difference signal based on the complex sum signal and the first correction coefficient; and an orientation direction error calculator to calculate an orientation direction error based on the corrected complex difference signal and the complex sum signal, the orientation direction error being a difference between an arrival direction and an orientation direction, the arrival direction being a direction from which the radio wave comes and arrives, the orientation direction being a direction in which the antenna is orientated.

17 Claims, 23 Drawing Sheets

(58) Field of Classification Search
USPC .......................................................... 342/449
See application file for complete search history.

(56) References Cited

U.S. PATENT DOCUMENTS

2010/0127930 A1* 5/2010 Nelson .................. H01Q 1/125
342/372
2012/0013500 A1* 1/2012 Markin .................. H01Q 25/02
342/149

FOREIGN PATENT DOCUMENTS

| JP | 7-234276 A | 9/1995 |
|---|---|---|
| JP | 9-68568 A | 3/1997 |
| JP | 9-264942 A | 10/1997 |
| JP | 11-284534 A | 10/1999 |
| JP | 2008-216070 A | 9/2008 |
| JP | 2011-220578 A | 11/2011 |
| JP | 2012-172980 A | 9/2012 |

OTHER PUBLICATIONS

International Search Report dated Jun. 11, 2019 in PCT/JP2019/016824 filed on Apr. 19, 2019, 2 pages.

* cited by examiner

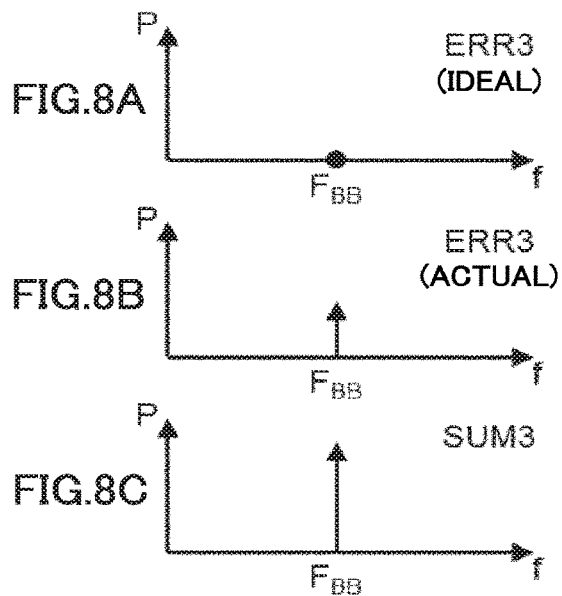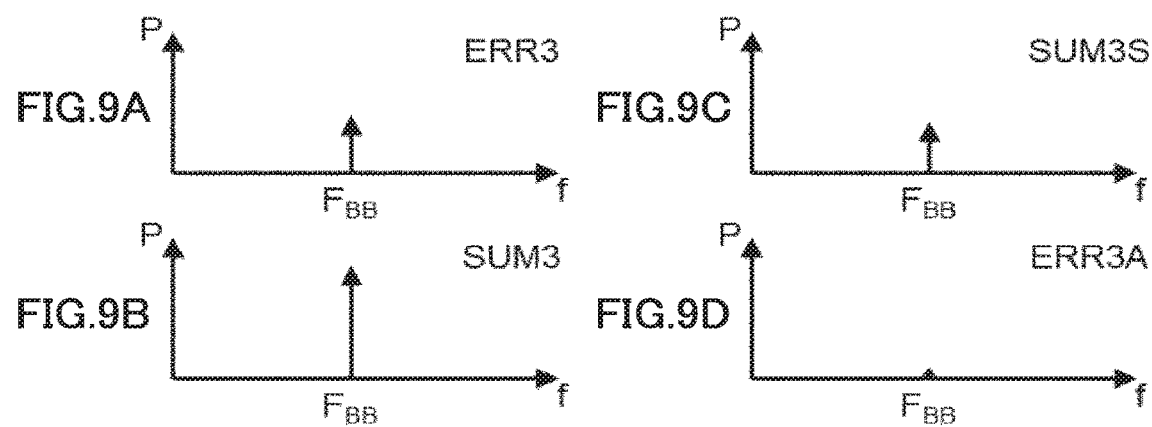

TRACKING RECEIVER, ANTENNA APPARATUS, AND TRACKING METHOD

TECHNICAL FIELD

The present disclosure relates to a tracking receiver to obtain an orientation direction error of an antenna from a sum signal and a difference signal outputted from the antenna, an antenna apparatus including the tracking receiver, and a tracking method.

BACKGROUND ART

A tracking receiver included in a monopulse system calculates an amplitude ratio and a phase difference between a sum signal (otherwise, referred to as a Σ signal, a SUM signal, etc.) and a difference signal (otherwise, referred to as a Δ signal, an ERR signal, etc.) outputted from the antenna. The calculated amplitude ratio and phase difference are information indicating a degree of deviation between a direction in which a communication partner exists and an orientation direction of the antenna. That is, the tracking receiver is a device that calculates an orientation direction error from the sum signal and the difference signal outputted from the antenna. The orientation direction error calculated by the tracking receiver is notified to an antenna drive controller configured to change the orientation direction of the antenna, and the antenna drive controller changes the orientation direction of the antenna.

As to the tracking receiver, a technology for accurately detecting the orientation direction error in an environment with a small carrier-to-noise ratio (CN ratio) has been studied (refer to Patent Literature 1).

CITATION LIST

Patent Literature

PTL 1: Japanese Patent Laying-Open No. 2012-172980

SUMMARY OF INVENTION

Technical Problem

In the tracking receiver, isolation (separation) between the sum signal and the difference signal of analog signals may not be sufficient. Insufficient isolation is referred to as poor isolation. Causes of the occurrence of the poor isolation are inadequate consideration in H/W design in the device, variations in component performance, and the like. When the poor isolation occurs, leakage (mixture) of the sum signal into the difference signal occurs. The difference signal resulting from the leakage brings the tracking receiver into a state where the orientation direction error outputted from the tracking receiver includes a steady error (bias) from an actual value. As a result, accuracy with which the antenna tracks the communication partner deteriorates.

For example, in a case where the orientation direction of the antenna matches with the direction in which the communication partner exists, the difference signal detected by the antenna becomes zero. In that case, the tracking receiver should output the orientation direction error to be zero. However, when leakage of the sum signal into the difference signal occurs inside the tracking receiver, the difference signal does not become zero, and the tracking receiver outputs a non-zero orientation direction error. When the actual orientation direction error is not zero, it is caused a state in which the orientation direction error outputted from the tracking receiver includes not only the actual orientation direction error but also the steady error (bias) due to the leakage of the sum signal into the difference signal.

No technique has been proposed to eliminate or reduce deterioration of the tracking accuracy due to the leakage of the sum signal into the difference signal caused by poor isolation.

An object of the present disclosure is to reduce deterioration of tracking accuracy in a case where leakage of a sum signal into a difference signal occurs due to poor isolation when an orientation direction of an antenna tracks an arrival direction of a radio wave.

Solutions to Problem

A tracking receiver according to the present disclosure includes: a complex sum signal generator to generate a complex sum signal by performing quadrature detection to a sum signal outputted from an antenna to receive a radio wave from a radio wave source and then converting a resultant of performing quadrature detection into a digital value, or converting the sum signal into a digital value and then performing quadrature detection; a complex difference signal generator to generate a complex difference signal by performing quadrature detection to a difference signal outputted from the antenna and then converting a resultant of performing quadrature detection into a digital value, or converting the difference signal into a digital value and then performing quadrature detection; a first correction coefficient storage to store a first correction coefficient represented by a complex number, the first correction coefficient being used when a leakage of the sum signal into the difference signal is estimated and corrected; complex difference signal correcting circuitry to calculate a corrected complex difference signal by correcting the complex difference signal based on the first correction coefficient; and an orientation direction error calculator to calculate an orientation direction error based on the corrected complex difference signal and the complex sum signal, the orientation direction error being a difference between an arrival direction and an orientation direction, the arrival direction being a direction from which the radio wave comes and arrives, the orientation direction being a direction in which the antenna is orientated.

An antenna apparatus according to the present disclosure includes: an antenna to receive a radio wave from a radio wave source; an antenna pedestal to support the antenna so that an orientation direction can be changed; an antenna driving device to change the orientation direction; a tracking receiver to obtain an orientation direction error from a sum signal and a different signal inputted, the sum signal and the difference signal being outputted from the antenna, the orientation direction error being a difference between the orientation direction and an arrival direction that is a direction from which the radio wave comes and arrives; and controlling circuitry to control the antenna driving device so that the orientation direction error, being inputted to the controlling circuitry, approaches zero.

The tracking receiver includes: a complex sum signal generator to generate a complex sum signal by performing quadrature detection to the sum signal and then converting a resultant of performing quadrature detection to a digital value, or converting the sum signal into a digital value and then performing quadrature detection; a complex difference signal generator to generate a complex difference signal by performing quadrature detection to the difference signal and then converting a resultant of performing quadrature detection into a digital value, or converting the difference signal into a digital value and then performing quadrature detection; a first correction coefficient storage to store a first correction coefficient represented by a complex number, the first correction coefficient being used when a leakage of the sum signal into the difference signal is estimated and corrected; complex difference signal correcting circuitry to calculate a corrected complex difference signal by correcting the complex difference signal based on the first correction coefficient; and an orientation direction error calculator to calculate an orientation direction error based on the corrected complex difference signal and the complex sum signal, the orientation direction error being a difference between an arrival direction and an orientation direction, the arrival direction being a direction from which the radio wave comes and arrives, the orientation direction being a direction in which the antenna is orientated.

A tracking method according to the present disclosure includes: receiving a radio wave in which an antenna receives the radio wave from a radio wave source and outputs a sum signal and a difference signal; generating a complex sum signal by performing quadrature detection to the sum signal outputted from the antenna and then converting a resultant of performing quadrature detection into a digital value, or converting the sum signal into a digital value and then performing quadrature detection; generating a complex difference signal by performing quadrature detection to the difference signal outputted from the antenna and then converting a resultant of performing quadrature detection into a digital value, or converting the difference signal into a digital value and then performing quadrature detection; correcting a complex difference signal in which a corrected complex difference signal is calculated by correcting the complex difference signal based on a first correction coefficient represented by a complex number, the first correction coefficient being used when a leakage of the sum signal into the difference signal is estimated and corrected; calculating an orientation direction error in which an orientation direction error is calculated based on the corrected complex difference signal and the complex sum signal, the orientation direction error being a difference between an arrival direction and an orientation direction, the arrival direction being a direction from which the radio wave comes and arrives, the orientation direction being a direction in which the antenna is orientated; and changing the orientation direction of the antenna so that the orientation direction error approaches zero.

Advantageous Effects of Invention

According to the present disclosure, when the orientation direction of the antenna tracks the arrival direction of the radio wave, in a case where the leakage of the sum signal into the difference signal occurs due to poor isolation, it is possible to reduce deterioration of tracking accuracy.

BRIEF DESCRIPTION OF DRAWINGS

FIGS. 8A to 8D are diagrams schematically showing states of signals at several points in the tracking receiver in the state of FIG. 7.

FIGS. 9A to 9D are diagrams schematically showing states of signals inside the difference signal correcting circuitry included in the tracking receiver according to the first embodiment.

DESCRIPTION OF EMBODIMENTS

First Embodiment

Figure 1:
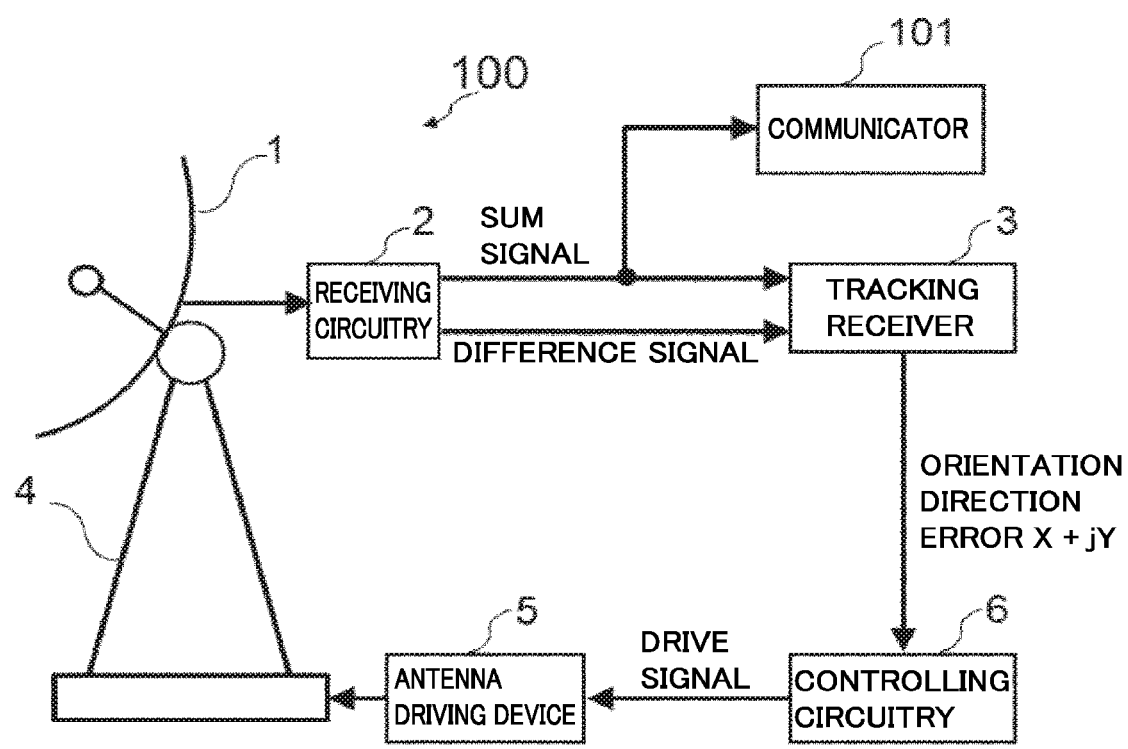
FIG. 1 is a diagram illustrating a configuration of an antenna apparatus including a tracking receiver according to the present disclosure.

FIG. 1 is a diagram illustrating a configuration of an antenna apparatus including a tracking receiver according to a first embodiment of this disclosure. An antenna apparatus 100 mainly includes an antenna 1, receiving circuitry 2, a tracking receiver 3, an antenna pedestal 4, an antenna driving device 5, and controlling circuitry 6. Antenna 1 receives a radio wave from a communication partner and transmits a radio wave to the communication partner. A communication satellite or the like, for example, may be considered as a communication partner. In some cases, a radio wave from the communication partner is received, and a radio wave is not transmitted to the communication partner. Antenna 1 is required at least to receive a radio wave from a radio wave source such as a communication partner or the like. Antenna 1 is supported by antenna pedestal 4 so that an orientation direction can be changed. Antenna driving device 5 moves antenna pedestal 4 to change the orientation direction of antenna 1, that is, an azimuth angle and an elevation angle. Controlling circuitry 6 controls antenna driving device 5.

Receiving circuitry 2 processes a received signal generated by antenna 1. For tracking receiver 3 included in a monopulse system, receiving circuitry 2 outputs a sum signal and a difference signal. The sum signal is a received signal used for communication. The sum signal is also inputted to a communicator 101 configured to communicate with the communication partner. The difference signal is a signal having a magnitude proportional to an orientation direction error. The orientation direction error is an error of the orientation direction of antenna 1 with respect to an arrival direction, which is a direction from which the radio wave comes and arrives. Receiving circuitry 2 generates, as the sum signal, a signal in a fundamental mode induced inside a primary radiator of antenna 1 by the radio wave received. Receiving circuitry 2 generates the difference signal from a higher-order mode induced inside the primary radiator. When antenna 1 faces the communication partner directly, only the fundamental mode is induced inside the primary radiator. When the orientation direction of antenna 1 includes an error with respect to the arrival direction, an electric field component in an axial direction of a waveguide appears inside the primary radiator, which is the waveguide, and the higher-order mode occurs in addition to the fundamental mode. Receiving circuitry 2 converts a radio frequency (RF) into an intermediate frequency (IF), which is lower, and outputs the sum signal and the difference signal in the IF band. A signal in the IF band is referred to as an IF signal, and a signal in the RF band is referred to as an RF signal.

Figure 2:
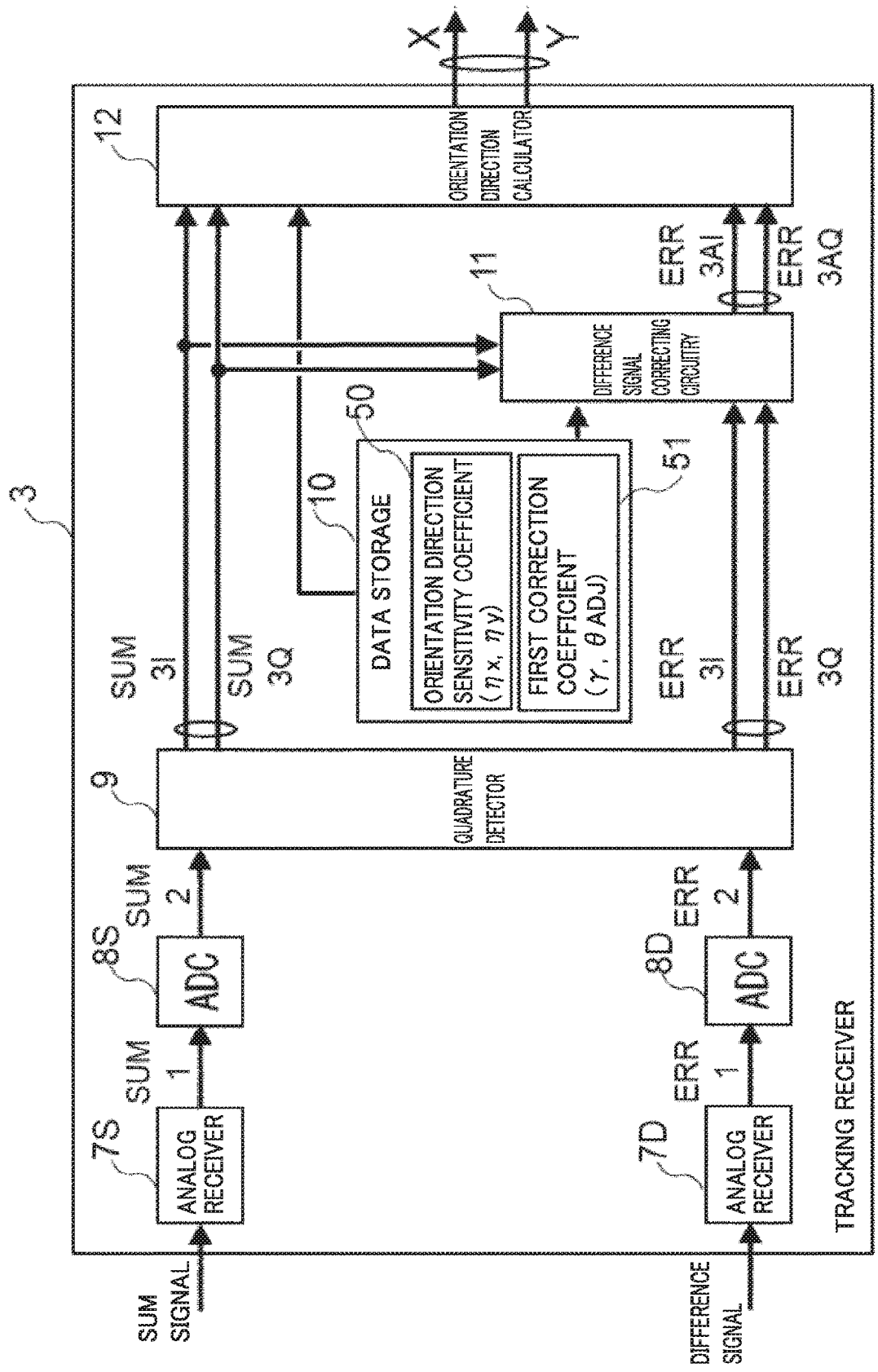
FIG. 2 is a block diagram illustrating a configuration of a tracking receiver according to a first embodiment of the present disclosure.

A configuration of tracking receiver 3 is described with reference to FIG. 2. FIG. 2 is a block diagram illustrating a configuration of the tracking receiver according to the first embodiment of this disclosure. Tracking receiver 3 includes analog receivers 7S, 7D, A/D converters 8S, 8D, a quadrature detector 9, a data storage 10, difference signal correcting circuitry 11, and an orientation direction calculator 12. In the drawing, the A/D converters are each denoted as an ADC (Analog Digital Converter). Analog receiver 7S extracts an IF signal from the sum signal outputted from the receiving circuitry 2. Analog receiver 7S removes signals in frequency bands other than a frequency band of the IF signal from the inputted sum signal, amplifies the signal, and outputs the amplified signal. The sum signal outputted from analog receiver 7S is inputted to A/D converter 8S. A/D converter 8S converts an analog sum signal changing continuously into a digital value. The digital value is converted at every time interval determined by a predetermined sampling frequency, and is represented by a predetermined number of bits. Analog receiver 7D and A/D converter 8D process the difference signal similarly Analog receiver 7D amplifies the difference signal with the same amplification factor as that of the sum signal.

Quadrature detector 9 performs quadrature detection to the sum signal outputted from A/D converter 8S, and outputs a complex sum signal represented by a complex number that changes at the frequency (Base Band, BB) of the original signal. The complex sum signal is a BB signal (signal having a frequency of BB). Quadrature detector 9 performs quadrature detection to the difference signal outputted from A/D converter 8D, and outputs a complex difference signal, which is a BB signal.

Data storage 10 stores an orientation direction sensitivity coefficient 50 and a first correction coefficient 51. A signal obtained by dividing the complex difference signal (including a corrected complex difference signal described later) by the complex sum signal is referred to as a normalized complex difference signal. Orientation direction sensitivity coefficient 50 is a parameter for converting the normalized complex difference signal into the orientation direction error. First correction coefficient 51 is used to correct the complex difference signal. First correction coefficient 51 is used to estimate amount of the leakage of the sum signal into the complex difference signal. The estimated leakage sum signal is removed from the complex difference signal.

Difference signal correcting circuitry 11 corrects the complex difference signal, using first correction coefficient 51 and outputs the corrected complex difference signal. The complex sum signal and the corrected complex difference signal are inputted to orientation direction calculator 12, and orientation direction calculator 12 calculates the orientation direction error. Orientation direction calculator 12 calculates the normalized complex difference signal by dividing the corrected complex difference signal by the complex sum signal. An orientation direction error X+jY is calculated by multiplying the normalized complex difference signal by orientation direction sensitivity coefficient 50. Orientation direction sensitivity coefficient 50 is determined to have different values for an X direction and for a Y direction, such as ηx in the X direction and ηy in the Y direction. Orientation direction sensitivity coefficient 50 having the same value in the X direction and the Y direction may be used.

Figure 3A:
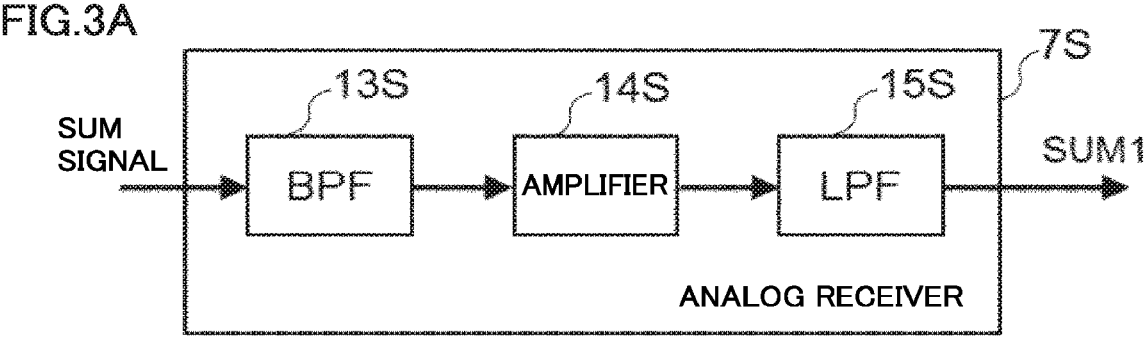
FIGS. 3A and 3B are block diagrams illustrating configurations of analog receivers included in the tracking receiver according to the first embodiment.
Figure 3B:
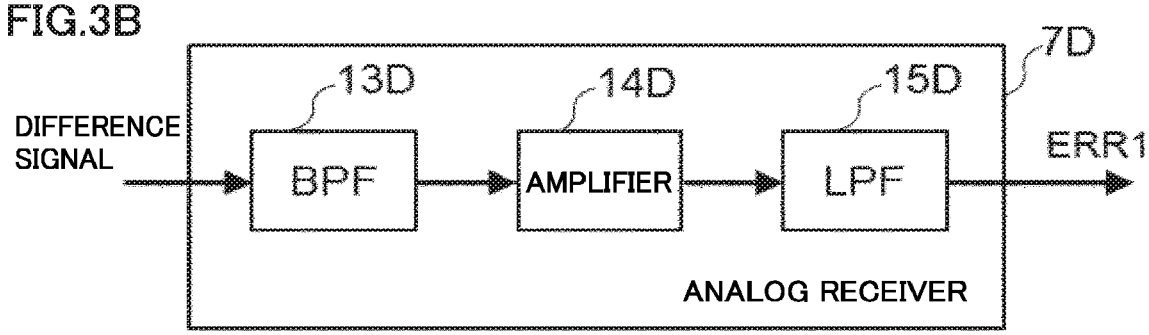

Configurations of analog receivers 7S, 7D are described with reference to FIGS. 3A and 3B. FIGS. 3A and 3B are block diagrams illustrating the configurations of the analog receivers included in the tracking receiver according to the first embodiment. Analog receiver 7S that processes the sum signal includes a band pass filter 13S, an amplifier 14S, and a low pass filter 15S. Band pass filter 13S, amplifier 14S, and low pass filter 15S are connected in series. The band pass filter is denoted as a BPF (Band Pass Filter) in the following description and drawings. The low pass filter is denoted as a LPF (Low Pass Filter) in the following description and figures.

BPF 13S removes noise and spurious from the sum signal in the IF band. Amplifier 14S amplifies the sum signal outputted from BPF 13S to a required signal level. LPF 15S removes a high frequency signal component from the amplified sum signal so that aliasing noise does not occur in A/D converter 8S. The sum signal outputted from analog receiver 7S is denoted as SUM1.

Analog receiver 7D that processes the difference signal includes a BPF 13D, an amplifier 14D, and an LPF 15D as with analog receiver 7S. BPF 13D, amplifier 14D and LPF 15D are connected in series. BPF 13D removes noise and spurious from the difference signal in the IF band. An amplification factor of amplifier 14S is inputted to amplifier 14D, and amplifier 14D amplifies the difference signal with the same amplification factor as that of amplifier 14S. In the drawing, a line with an arrow or the like is not drawn for indicating the amplification factor of amplifier 14S inputted to amplifier 14D. LPF 15D removes a high-frequency signal component from the amplified difference signal. The difference signal outputted from analog receiver 7D is denoted as ERR1.

A/D converter 8S converts sum signal SUM1 that is the inputted analog signal into a digital signal and outputs a sum signal SUM2. A/D converter 8D converts difference signal ERR1 that is the inputted analog signal into a digital signal and outputs a difference signal ERR2.

Figure 4:
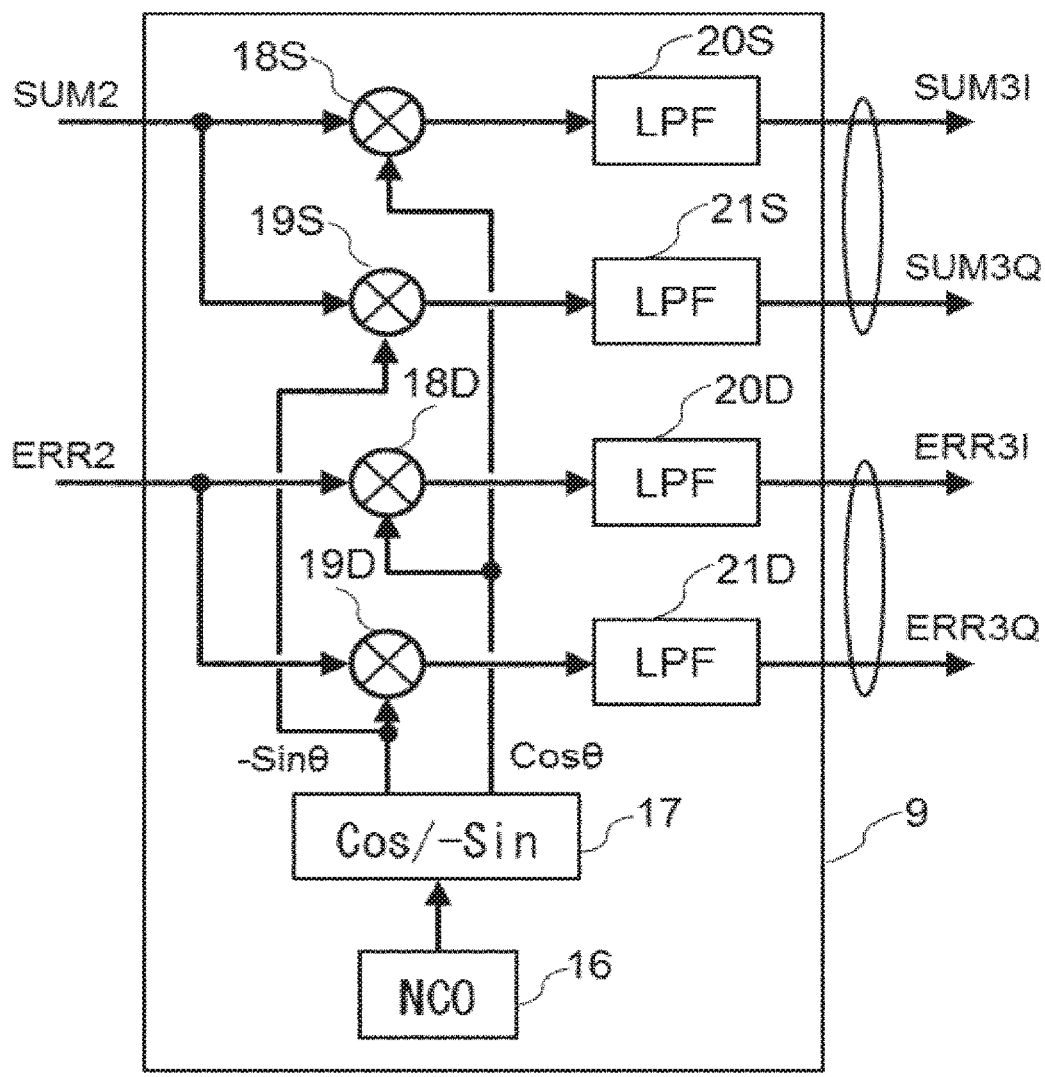
FIG. 4 is a block diagram illustrating a configuration of a quadrature detector included in the tracking receiver according to the first embodiment.

A configuration of quadrature detector 9 is described with reference to FIG. 4. FIG. 4 is a block diagram illustrating the configuration of the quadrature detector included in the tracking receiver according to the first embodiment. Quadrature detector 9 includes a numerically controlled oscillator (NCO) 16, a cos/−sin generator 17, four multipliers 18S, 18D, 19S, 19D, and four LPFs 20S, 20D, 21S, 21D. NCO 16 integrates a phase change proportional to a numerical value inputted at a determined sampling period, and outputs a phase θ. Cos/−sin generator 17 outputs a cosine value cos θ with respect to phase θ outputted from NCO 16, and −sin θ having a phase advanced by 90 degrees with respect to cosine value cos θ.

Multiplier 18S multiplies sum signal SUM2 by cos θ. LPF 20S smoothes output of multiplier 18S, and outputs an I component (In-phase component) SUM3I of the sum signal in a BB band. Multiplier 19S multiplies sum signal SUM2 by −sin θ. LPF 21S smoothes output of multiplier 19S, and outputs a Q component (Quadrature component) SUM3Q of the sum signal in the BB band. A signal representing I component SUM3I of the sum signal and Q component SUM3Q of the sum signal as a complex number is referred to as a complex sum signal SUM3=SUM3I+jSUM3Q.

Multiplier 18D multiplies difference signal ERR2 by cos 9. LPF 20D smoothes output of multiplier 18D, and outputs an I component ERR3I of the difference signal in the BB band. Multiplier 19D multiplies difference signal ERR2 by −sin θ. LPF 21D smoothes output of multiplier 19D, and outputs a Q component ERR3Q of the difference signal in the BB band. A signal representing I component ERR3I of the difference signal and Q component ERR3Q of the difference signal as a complex number is referred to as a complex difference signal ERR3=ERR3I+jERR3Q.

A/D converter 8S and quadrature detector 9 constitute a complex sum signal generator that generates the complex sum signal by converting the sum signal outputted from antenna 1 into the digital value and then performing quadrature detection. Strictly speaking, in quadrature detector 9, numerically controlled oscillator 16, cos/−sin generator 17, multipliers 18S, 19S, and LPFs 20S, 21S constitute the complex sum signal generator. A/D converter 8D and quadrature detector 9 constitute a complex difference signal generator that generates the complex difference signal by converting the difference signal outputted from antenna 1 into the digital value and then performing quadrature detection. Strictly speaking, in quadrature detector 9, numerically controlled oscillator 16, cos/−sin generator 17, multipliers 18D, 19D, and LPFs 20D, 21D constitute the complex difference signal generator.

Data storage 10 is a first correction coefficient storage that stores first correction coefficient 51 represented by a complex number. Difference signal correcting circuitry 11 is complex difference signal correcting circuitry to correct the complex difference signal based on first correction coefficient 51 and to calculate the corrected complex difference signal.

The following variables are defined with respect to orientation direction sensitivity coefficient 50 and first correction coefficient 51.

ηx: a sensitivity coefficient (real number) in the X direction between an absolute value of the orientation direction error and an absolute value of the normalized complex difference signal.

ηy: a sensitivity coefficient (real number) in the Y direction between the absolute value of the orientation direction error and the absolute value of the normalized complex difference signal.

α: a complex number representing first correction coefficient 51.

θADJ: a phase of α [rad]. This is caused by a difference between a sum signal path and a leakage path.

C: an amplitude of α. C=|α|

γ: a logarithmic value of C [dB]. γ=20·log$_{10}$C

Data storage 10 stores θADJ and γ as first correction coefficient 51. C=10$^{γ/20}$ may be stored instead of γ. Complex number α may be represented and stored in rectangular coordinates instead of polar coordinates.

Figure 5:
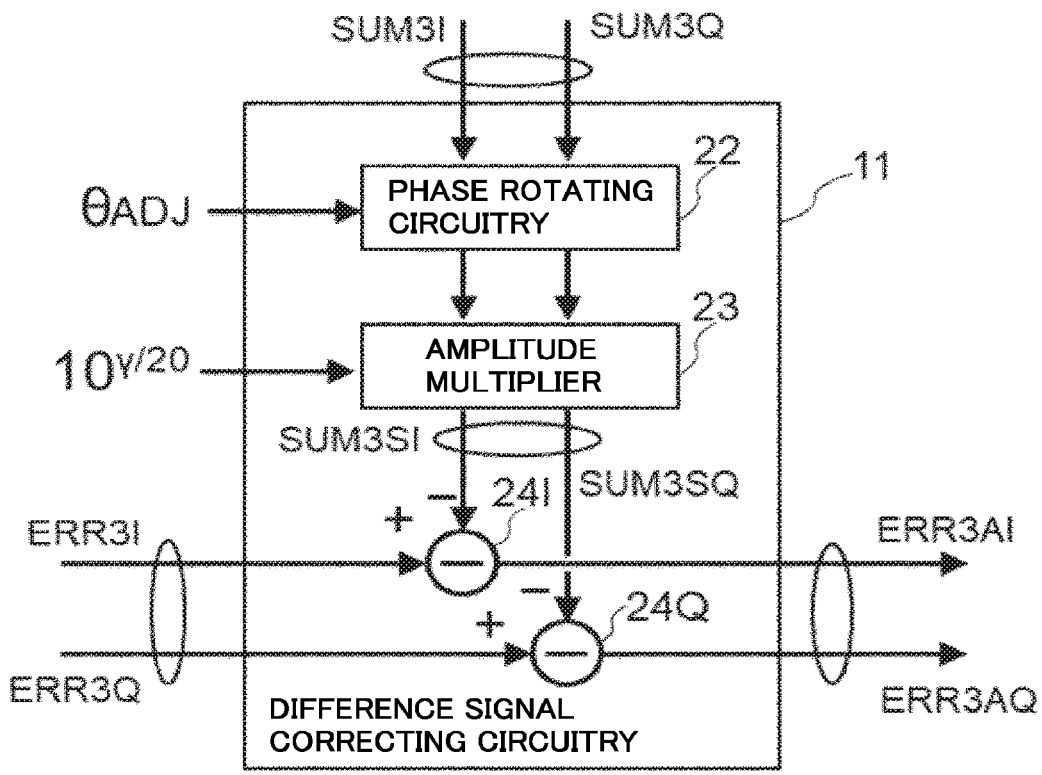
FIG. 5 is a block diagram illustrating a configuration of difference signal correcting circuitry included in the tracking receiver according to the first embodiment.

A configuration of difference signal correcting circuitry 11 is described with reference to FIG. 5. FIG. 5 is a block diagram illustrating the configuration of the difference signal correcting circuitry included in the tracking receiver according to the first embodiment. Difference signal correcting circuitry 11 includes phase rotating circuitry 22, an amplitude multiplier 23, and subtractors 24I, 24Q. Complex difference signal ERR3 is inputted to difference signal correcting circuitry 11, and complex difference signal ERR3 is corrected, using complex sum signal SUM3 and first correction coefficient 51.

Phase rotating circuitry 22 rotates a phase of complex sum signal SUM3 by θADJ. That is, phase rotating circuitry 22 multiplies complex sum signal SUM3 by exp(jθADJ). Amplitude multiplier 23 converts an amplitude correction value γ [dB] into an antilogarithm C by the following equation and multiplies complex sum signal SUM3 by C.

$$C=10^{\gamma/20} \qquad (1)$$

FIG. 5 illustrates that complex sum signal SUM3 is processed by phase rotating circuitry 22 and then processed by amplitude multiplier 23. Amplitude multiplier 23 may be processed first. Phase rotating circuitry 22 and amplitude multiplier 23 multiply complex sum signal SUM3 by complex number a represented by the following equation to obtain an estimated leakage sum signal SUM3S. Complex number a is first correction coefficient 51.

$$\alpha = C \cdot \exp(j\theta ADJ) = (10^{\gamma/20}) \cdot \exp(j\theta ADJ) \quad (2)$$

$$SUM3S = \alpha \cdot SUM3 = SUM3SI + jSUM3SQ \quad (3)$$

Estimated leakage sum signal SUM3S is a signal representing an estimated amount of the signal that is the sum signal leaking into the difference signal. Leakage of the sum signal into the difference signal occurs because the isolation (separation) between a circuit of the sum signal and a circuit of the difference signal is not perfect in an analog circuit portion of a receiving device antenna apparatus 100. By removing estimated leakage sum signal SUM3S from complex difference signal ERR3, a complex difference signal closer to a true value than complex difference signal ERR3 is obtained.

Subtractors 24I and 24Q subtract estimated leakage sum signal SUM3S from complex difference signal ERR3 to calculate a corrected complex difference signal ERR3A. That is, subtractors 24I and 24Q calculate corrected complex difference signal ERR3A by the following equation.

$$ERR3A = ERR3 - SUM3S$$

$$= ERR3AI + jERR3AQ \quad (4)$$

$$ERR3AI = ERR3I - SUM3SI \quad (5)$$

$$ERR3AQ = ERR3Q - SUM3SQ \quad (6)$$

Orientation direction calculator 12 is an orientation direction error calculator to calculate the orientation direction error, which is a difference between the arrival direction of the radio wave and the orientation direction of antenna 1, based on corrected complex difference signal ERR3A and complex sum signal SUM3.

Figure 6:
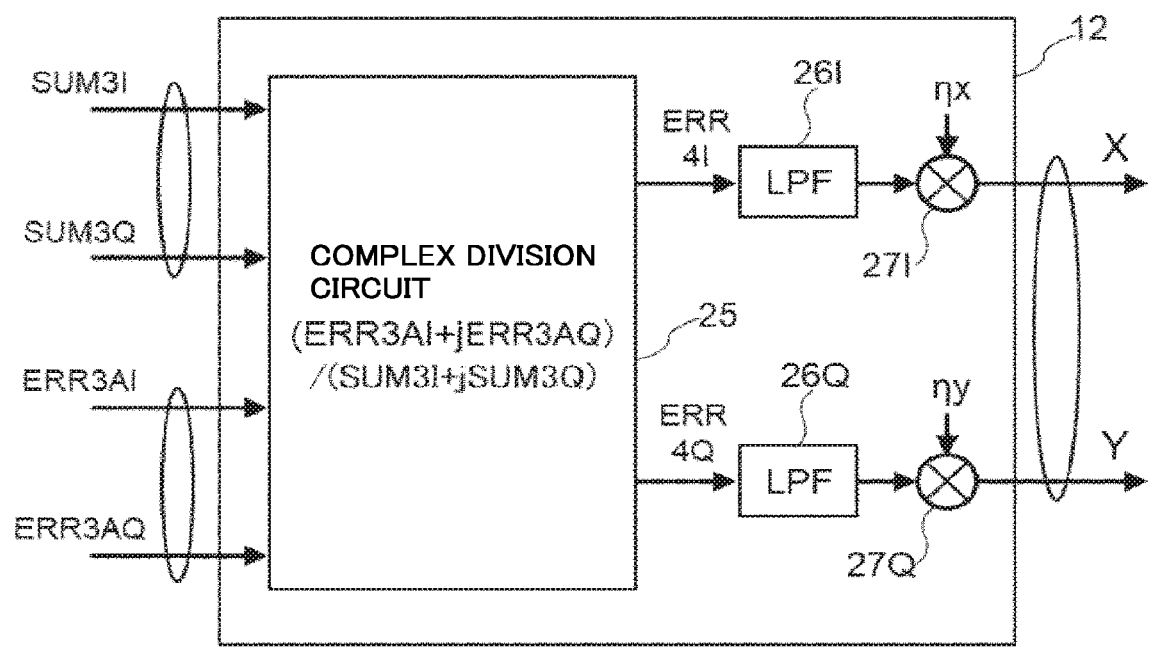
FIG. 6 is a block diagram illustrating a configuration of an orientation direction calculator included in the tracking receiver according to the first embodiment.

A configuration of orientation direction calculator 12 is described with reference to FIG. 6. FIG. 6 is a block diagram illustrating the configuration of the orientation direction calculator included in the tracking receiver according to the first embodiment. Orientation direction calculator 12 includes a complex division circuit 25, two LPFs 26I, 26Q, and two multipliers 27I, 27Q. Complex division circuit 25 calculates a normalized difference signal ERR4 by dividing corrected complex difference signal ERR3A by complex sum signal SUM3. That is, complex division circuit 25 calculates normalized difference signal ERR4=ERR4I+jERR4Q by the following equation.

$$ERR4 = ERR4I + jERR4Q$$

$$= ERR3A / SUM3$$

$$= (ERR3AI + jERR3AQ) / (SUM3I + jSUM3Q) \quad (7)$$

Strictly speaking, measured complex sum signal SUM3 is reduced by an amount of the signal leaking from the sum signal inputted to tracking receiver 3 into the difference signal. Corrected complex difference signal ERR3A may be divided by, instead of complex sum signal SUM3, the sum signal (SUM3+SUM3S) obtained by adding estimated leakage sum signal SUM3S to complex sum signal SUM3 to calculate the normalized complex difference signal. That is, normalized complex difference signal ERR4 may be calculated by the following equation (8).

$$ERR4 = ERR3A / (SUM3 + SUM3S) \quad (8)$$

In many cases, leakage sum signal SUM3S is sufficiently smaller, as compared to complex sum signal SUM3. Therefore, in many cases, a difference between calculation results of equations (7) and (8) can be ignored.

Since estimated leakage sum signal SUM3 S is calculated based on complex sum signal SUM3, the orientation direction error is calculated based on the corrected complex difference signal and the complex sum signal when the normalized complex difference signal and further the orientation direction error are calculated using equation (8).

LPF 26I smoothes an I component ERR4I of normalized difference signal ERR4 outputted from complex division circuit 25. LPF 26Q smoothes a Q component ERR4Q of normalized difference signal ERR4 outputted from complex division circuit 25.

Multiplier 27I multiplies I component ERR4I of normalized complex difference signal ERR4 by real number $\eta x$ representing orientation direction sensitivity coefficient 50. Output of multiplier 27I is an X component of the orientation direction error. Multiplier 27Q multiplies Q component ERR4Q of normalized complex difference signal ERR4 by real number $\eta y$. Output of multiplier 27O is a Y component of the orientation direction error. That is, orientation direction error X+jY is calculated by the following equations (9) to (11).

$$X = \eta x \cdot ERR4I \quad (9)$$

$$Y = \eta y \cdot ERR4Q \quad (10)$$

$$\sqrt{(X^2 + Y^2)} = \sqrt{(\eta x^2 \cdot ERR4I^2 + \eta y^2 \cdot ERR4Q^2)} \quad (11)$$

A phase error may occur between normalized complex difference signal ERR4 and orientation direction error X+jY, or orientation direction sensitivity coefficients $\eta x$, $\eta y$ may change, depending on a situation. The tracking receiver also performs processing to deal with them. In this specification, details of the above processing are omitted. Also in the case where the above processing is performed, based on the corrected complex difference signal and the complex sum signal, the orientation direction calculator calculates the orientation direction error, which is the difference between the arrival direction, which is the direction from which the radio wave comes and arrives, and the orientation direction, which is a direction in which the antenna is orientated.

Orientation direction error X+jY outputted from tracking receiver 3 is inputted to controlling circuitry 6. Controlling circuitry 6 changes the orientation direction of antenna 1 by controlling antenna driving device 5 so that orientation direction error X+jY approaches zero. Here, the X direction in which an orientation direction error X occurs and the Y direction in which an orientation direction error Y occurs are described. The azimuth angle of the current orientation direction of antenna 1 is AZ0, and the elevation angle is EL0. The Y direction is a direction in which the elevation angle is changed. That is, the Y direction is a direction of movement on a great circle on a celestial sphere passing the orientation direction (AZ0, EL0) and a zenith. The X direction is a direction of a great circle passing the orientation direction (AZ0, EL0) and orthogonal to the Y direction in the celestial sphere.

Figure 7:
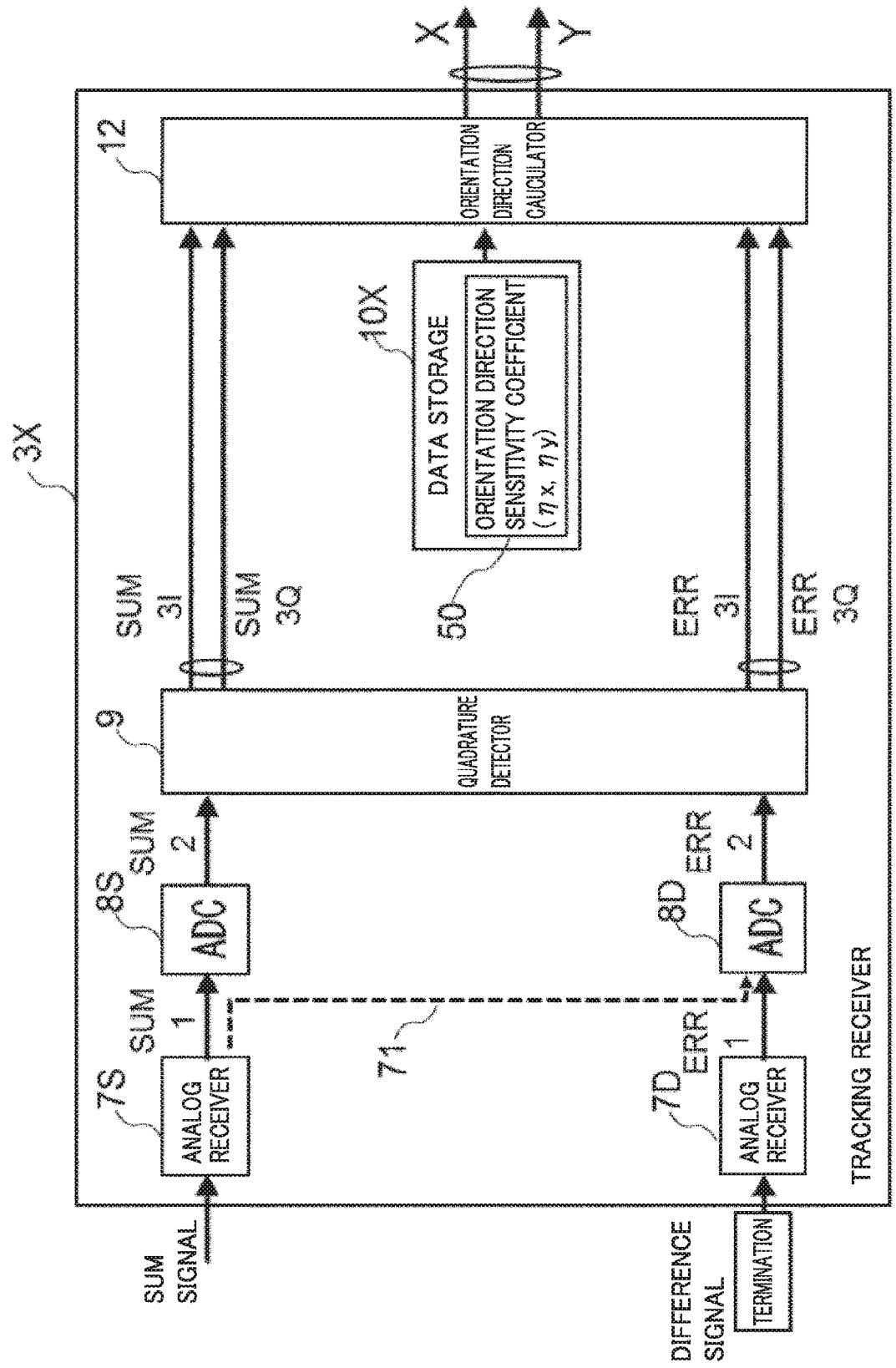
FIG. 7 is a diagram showing a state where a termination resistor is connected to an input terminal of a difference signal and only a sum signal is inputted in a conventional tracking receiver having no difference signal correcting circuitry.

A method for determining first correction coefficient 51 is described with reference to FIGS. 7 and 8. FIG. 7 is a diagram showing a state where a termination resistor is connected to an input terminal of the difference signal and only the sum signal is inputted in a conventional tracking receiver 3X having no difference signal correcting circuitry. Instead of tracking receiver 3X, tracking receiver 3 shown in FIG. 2, in a state where α, which is first correction coefficient 51, is set to zero, may be used to calculate the orientation direction error of by connecting input terminal of the difference signal with the termination resistor. FIG. 7 shows a path 71 where the sum signal leaks into the difference signal in the analog circuit.

FIGS. 8A to 8D are diagrams schematically showing states of signals at several points in tracking receiver 3X in the state of FIG. 7. FIG. 8A shows a frequency spectrum of complex difference signal ERR3 in an ideal case where there is no leakage of the sum signal. FIG. 8B shows a frequency spectrum of complex difference signal ERR3 when there is leakage of the sum signal. FIG. 8C shows a frequency spectrum of complex sum signal SUM3. FIG. 8D shows orientation direction errors in the case where there is leakage of the sum signal into the difference signal and in the case where there is no leakage. Since the input terminal of the difference signal is terminated, there is no signal of complex difference signal ERR3, ideally, as shown in FIG. 8A. However, since the sum signal actually leaks into the difference signal, a component having a frequency $F_{BB}$ that is the frequency of the BB signal exists in complex difference signal ERR3 as shown in FIG. 8B. As shown in FIG. 8C, the component of frequency $F_{BB}$ exists in complex sum signal SUM3. In FIG. 8D, although the orientation direction error should be zero as indicated by a white circle, an orientation direction error X1+jY1 indicated by a solid arrow occurs. Since orientation direction sensitivity coefficients ηx, ηy are coefficients related when the antenna is connected, there is no problem in assuming that ηx=ηy=1 is satisfied in calculating first correction coefficient 51. Here, it is assumed that ηx=ηy=1 and sum signal SUM3 set supposedly is inputted to measure orientation direction error X1+jY1.

Complex difference signal ERR3 is estimated from orientation direction error X1+jY1 measured in the state shown in FIG. 7. Since difference signal correcting circuitry 11 is not provided, SUM3S=0 is satisfied. Accordingly, ERR3 is estimated from X1+jY1 as shown in the following equation.

$$ERR3=ERR3A=(X1+jY1)\cdot SUM3 \quad (12)$$

Since the termination resistor is connected to the input terminal of the difference signal, the difference signal is not inputted to tracking receiver 3X. Accordingly, ERR3 calculated by equation (12) is considered to be the leakage sum signal generated due to the sum signal mixing into the difference signal circuit. Referring to expression (12), α, which is first correction coefficient 51, is determined as follows. As described above, first correction coefficient α is determined based on the orientation direction error calculated in the state where the sum signal is inputted to tracking receiver 3X without inputting the difference signal.

$$\alpha=X1+jY1 \quad (13)$$

$$\theta ADJ=\arctan(Y1/X1) \quad (14)$$

$$\gamma=20\cdot(\log_{10}(\sqrt{(X1^2+Y1^2)})) \quad (15)$$

First correction coefficient α is a complex number calculated based on the complex sum signal and the complex difference signal generated in the state where the sum signal is inputted to the tracking receiver without inputting the difference signal.

First correction coefficient α may be determined so that a square error is minimized based on the complex sum signal and the complex difference signal generated in each of a plurality of states in which both the sum signal and the difference signal are inputted to the tracking receiver. First correction coefficient α may be determined in any manner as long as it is determined so that the amount of the leakage of the sum signal into the difference signal in the analog circuit can be accurately estimated.

Operation is described. Antenna 1 receives the radio wave, and outputs the sum signal and the difference signal. The sum signal and the difference signal are inputted to tracking receiver 3. By digitizing the sum signal and performing the quadrature detection, complex sum signal SUM3 is calculated. By digitizing the difference signal and performing the quadrature detection, complex difference signal ERR3 is calculated. Difference signal correcting circuitry 11 calculates corrected complex difference signal ERR3A by subtracting estimated leakage sum signal SUM3S from complex difference signal ERR3. Orientation direction calculator 12 calculates orientation direction error X+jY by dividing corrected complex difference signal ERR3A by complex sum signal SUM3 and further multiplying the resultant by orientation direction sensitivity coefficients ηx, ηy. Controlling circuitry 6 controls antenna driving device 5 so that orientation direction error X+jY approaches zero.

A tracking method for tracking the antenna to the radio wave source includes the following process. In receiving a radio wave, the antenna receives the radio wave from the radio wave source and outputs the sum signal and the difference signal. In generating a complex sum signal, the complex sum signal is generated by converting the sum signal into a digital value and then performing the quadrature detection. In generating a complex difference signal, the complex difference signal is generated by converting the difference signal into a digital value and then performing the quadrature detection. In correcting a complex difference signal, a corrected complex difference signal is calculated by correcting the complex difference signal based on the first correction coefficient represented by the complex number. In calculating an orientation direction error, based on the corrected complex difference signal and the complex sum signal, the orientation direction error, which is an error between the arrival direction of the radio wave and the orientation direction of the antenna, is calculated. In changing an orientation direction, the orientation direction of the antenna is changed so that the orientation direction error approaches zero.

Difference signal correcting circuitry 11 estimates and removes the complex sum signal leaking into complex difference signal ERR3. Therefore, in corrected complex difference signal ERR3A corrected by difference signal correcting circuitry 11, the leakage sum signal becomes smaller than that in complex difference signal ERR3. Orientation direction error X+jY calculated using corrected complex difference signal ERR3A becomes a value closer to the actual orientation direction error, because an influence of the leakage of the sum signal into the difference signal is removed or reduced.

Orientation direction error X+jY when the complex difference signal is corrected with first correction coefficient α determined as in equation (13) is calculated as in the following equation. Since as to correction coefficients, ηx=ηy=1 is used in deriving equation (13), the following equations do not include correction coefficients ηx, ηy.

$$X+jY=ERR3A/SUM3$$

$$=(ERR3-\alpha\cdot SUM3)/SUM3$$

$$=ERR3/SUM3-\alpha$$

$$=ERR3/SUM3-(X1+jY1) \quad (16)$$

Assuming that difference signal ERR3 obtained by performing the quadrature detection in the case where the difference signal having an amplitude of zero is inputted to tracking receiver 3 can be accurately estimated by equation (12), the following equation is obtained by substituting equation (12) into equation (16).

$$X+jY=(X1+jY1)\cdot SUM3/SUM3-(X1+jY1)$$

$$=(X1+jY1)-(X1+jY1)=0 \quad (17)$$

Equation (17) indicates that the influence of the sum signal leaking into the difference signal on the orientation direction error can be removed. There is a possibility that first correction coefficient α, calculated from the orientation direction error measured in the state shown in FIG. 7, has an error with a ratio of an amount of the sum signal actually leaking into the difference signal to the sum signal. When there is no error in first correction coefficient α, the influence of the leakage can be removed from the orientation direction error. Even when first correction coefficient α has the error, a bias of the orientation direction error due to the leakage of the sum signal into the difference signal can be reduced by performing the correction using first correction coefficient α estimated by equation (13).

FIGS. 9A to 9D are schematic diagrams illustrating operation of the difference signal correcting circuitry. FIG. 9A shows a frequency spectrum of complex difference signal ERR3. FIG. 9B shows a frequency spectrum of complex sum signal SUM3. FIG. 9C shows a frequency spectrum of estimated leakage sum signal SUM3S. FIG. 9D shows a frequency spectrum of corrected complex difference signal ERR3A. As shown in FIG. 9A, the component having the frequency $F_{BB}$ exists in complex difference signal ERR3. As shown in FIG. 9B, the component having the frequency $F_{BB}$ exists in complex sum signal SUM3. Estimated leakage sum signal SUM3S is a signal obtained by multiplying complex sum signal SUM3 by complex number a. Therefore, as shown in FIG. 9C, the component having the frequency $F_{BB}$ exists in estimated leakage difference signal SUM3. A signal strength of SUM3S is smaller than that of SUM3. The signal strength of SUM3S is almost equal to the signal strength of ERR3. Therefore, as shown in FIG. 9D, in corrected complex difference signal ERR3A, the signal strength of the component having the frequency $F_{BB}$ becomes substantially zero.

An effect of the correction by difference signal correcting circuitry 11 is described using a numerical example. In calculating the numerical example, the following situation is assumed. An unmodulated continuous wave (CW) is used as the sum signal. Actually, in a state where the orientation direction error is zero, complex difference signal ERR3 having $\gamma_{TRUE}$=−54 [dBc], 5 [deg] is generated due to the leakage of the sum signal into the difference signal inside tracking receiver 3. It is assumed that in difference signal correcting circuitry 11, γ=−52 [dBc], θADJ=0 [deg] are set.

$$\gamma_{TRUE}=20\cdot \log_{10}(|ERR3|/|SUM3|)=-54 \text{ [dBc]}$$

$$\arctan(ERR3Q/ERR3I)-\arctan(SUM3Q/SUM3I)=\pi\cdot(5/180)\text{[rad]}$$

$$\gamma=20\cdot \log_{10}(|SUM3S|/|SUM3|)=-52 \text{ [dBc]}$$

$$\theta ADJ=\arctan(SUM3SQ/SUM3SI)-\arctan(SUM3Q/SUM3I)=0\text{[rad]}$$

Corrected complex difference signal ERR3A corrected by difference signal correcting circuitry 11 is calculated as follows. Here, it is assumed that $\gamma_{AMD}$ is a value represented as a logarithm and obtained by dividing an absolute value |ERR3A| of the corrected complex difference signal by an absolute value |SUM3| of the complex sum signal.

$$ERR3A=ERR3-SUM3S$$

$$=\{10^{(-54/20)}\cdot(\cos(\pi(5/180))+j\sin(\pi(5/180)))-10^{(-52/20)}\}\cdot SUM3$$

$$=10^{(-2.7)}\cdot\{\cos(\pi(5/180))-10^{0.1}+j\sin(\pi(5/180)))\}\cdot SUM3$$

$$|ERR3A|^2=10^{(-5.4)}\cdot\{(\cos(\pi(5/180))-10^{0.1}+)^2+\sin^2(\pi(5/180))\}\cdot|SUM3|^2$$

$$\gamma_{AMD}=20\cdot \log_{10}(|ERR3A|/|SUM3A|)=-65.1 \text{ [dBc]}$$

$\gamma_{AMD}$=−65.1 [dBc] is obtained. It can be seen that difference signal correcting circuitry 11 can reduce the bias of the orientation direction error, as compared with $\gamma_{TRUE}$=−54 [dBc].

Figure 10:
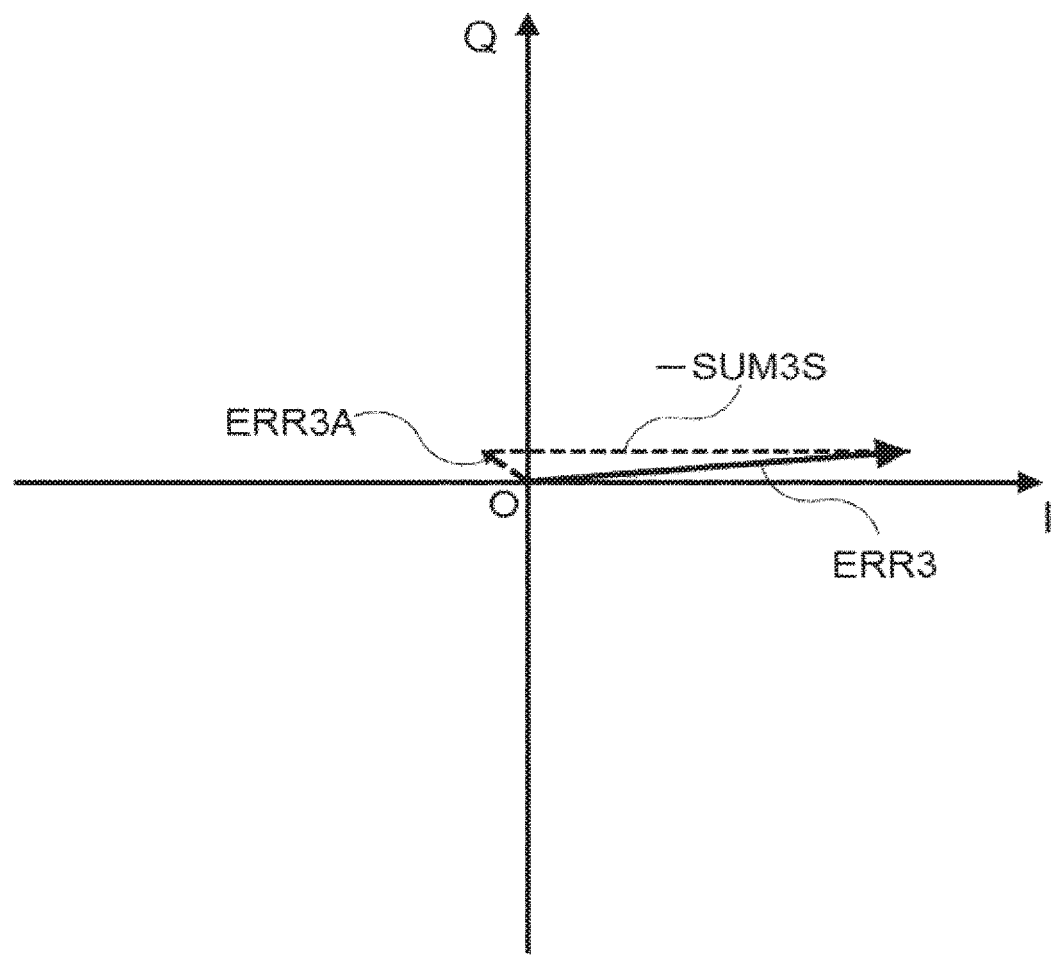
FIG. 10 is a diagram schematically showing an operation of reducing an orientation direction error by the difference signal correcting circuitry included in the tracking receiver according to the first embodiment.

FIG. 10 schematically shows the effect of improving the orientation direction error. ERR3A is obtained by adding −SUM3S, being parallel to an I-axis, to ERR3 having an angle of 5 [deg] with respect to the I-axis. ERR3A is closer to an origin of a complex plane than ERR3. Since the absolute value of ERR3A is smaller than the absolute value of ERR3, it can be seen that corrected complex difference signal ERR3A corrected by difference signal correcting circuitry 11 has a smaller bias of the orientation direction error, and that the orientation direction error is more accurately obtained. That is, when the orientation direction of the antenna tracks the arrival direction of the radio wave, the deterioration of the tracking accuracy can be reduced.

Even when first correction coefficient α used in difference signal correcting circuitry 11 has an error to the actually generated leakage amount of the sum signal, the bias of the orientation direction error can be reduced.

It is considered about to what extent of the error existing in first correction coefficient α allow to bring about the effect of reducing the bias of the orientation direction error. For this purpose, the following variables are defined. Variables defined before are also indicated.

MERR: an actually generated leakage sum signal into difference signal.

$$MERR=MERRI+jMERRQ$$

α0: a correction coefficient that represents leakage sum signal MERR.

$$\alpha 0=MERR/SUM3$$

γ0: an amplitude correction coefficient [dBc] of α0.
$$\gamma 0=20\cdot \log_{10}(|\alpha 0|)$$

θADJ0: a phase rotation amount of α0.

$$\theta ADJ0=\arctan(MERRQ/MERRI)$$

α: first correction coefficient 51 to be set.
γ: an amplitude correction coefficient [dBc] of α.
$$\gamma=20\cdot \log_{10}(|\alpha|)$$

θADJ: a phase rotation amount of α.

Δγ: an estimated error of the amplitude correction coefficient. Δγ=γ−γ0

ΔθADJ: an estimated error of θADJ with respect to θADJ0.

$$\Delta\theta ADJ=\theta ADJ-\theta ADJ0$$

G: an error reduction coefficient [dB].

$$G=10\cdot \log_{10}(|ERR3A|/|MERR|)$$

As G is negative and has a larger absolute value, the effect of reducing the error is greater.

Figure 11:
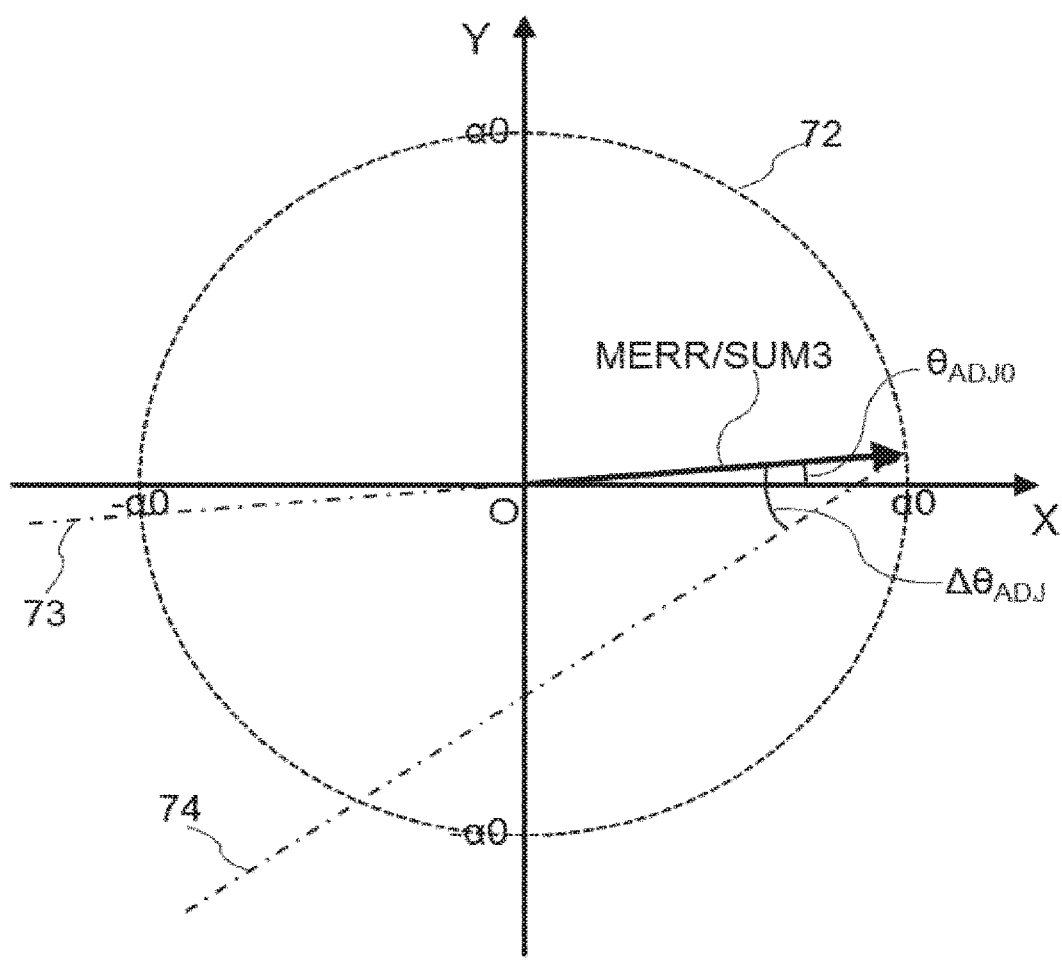
FIG. 11 is a diagram illustrating a condition for examining a correction effect of a correction coefficient having an error and being used in the difference signal correcting circuitry included in the tracking receiver according to the first embodiment.
Figure 12:
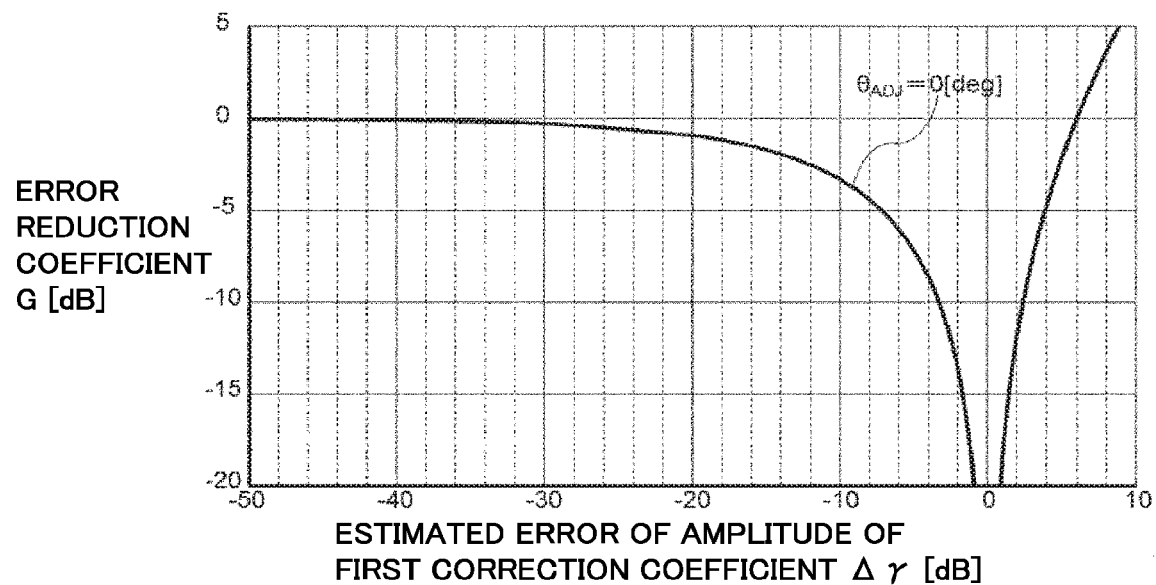
FIG. 12 is a graph showing a change in an error reduction coefficient with respect to a change in an amplitude correction coefficient when an error in a phase rotation amount is 0 degree in the difference signal correcting circuitry included in the tracking receiver according to the first embodiment.
Figure 13:
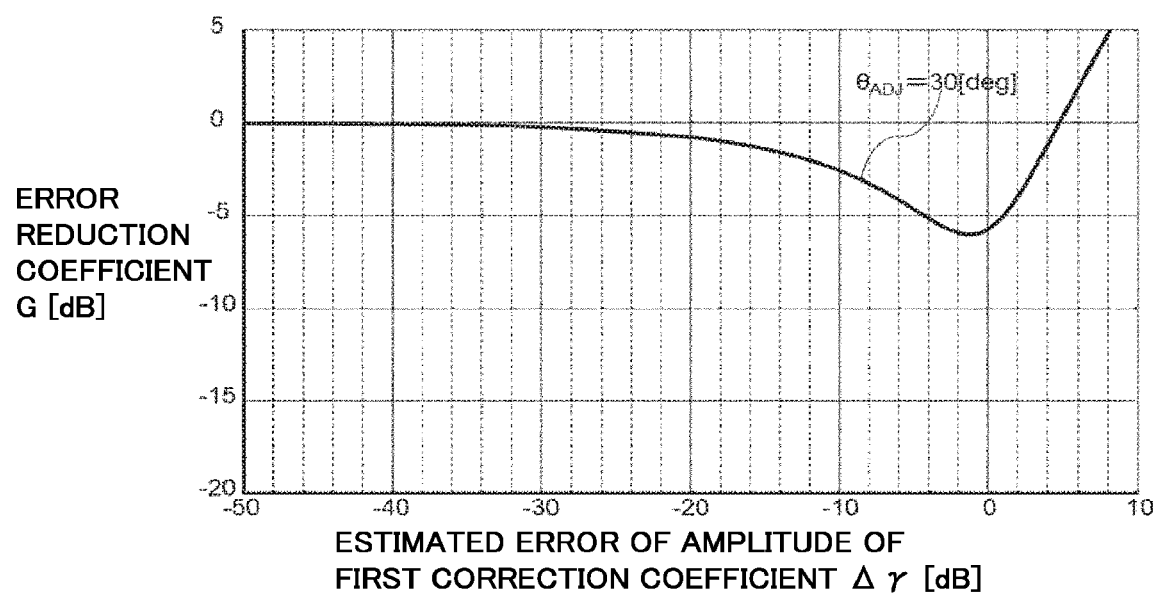
FIG. 13 is a graph showing a change in the error reduction coefficient with respect to the change in the amplitude correction coefficient when the error in the phase rotation amount is 30 degrees in the difference signal correcting circuitry included in the tracking receiver according to the first embodiment.

FIG. 11 is a diagram illustrating a condition for examining the correction effect of the correction coefficient having the error and being used in the difference signal correcting circuitry included in the tracking receiver according to the first embodiment. FIG. 11 shows the case where ERR1=0, that is, the orientation direction error is zero. When corrected complex difference signal ERR3A exists inside an effective correction range 72 indicated by a dotted line in FIG. 11, G<0, that is, |ERR3A|<|MERR| is obtained. That is, corrected complex difference signal ERR3A becomes smaller than leakage sum signal MERR. A condition of first correction coefficient α that allows G<0 is considered. FIG. 11 shows two change loci 73, 74 of amplitude correction coefficients obtained by changing γ with ΔθADJ constant. Change locus 73 indicates a case where γ is changed at ΔθADJ=0 [deg]. Change locus 74 indicates a case where γ is changed at ΔθADJ=30 [deg]. FIG. 12 shows a change in error reduction coefficient G when estimated error Δγ of the amplitude correction coefficient is changed in change locus 73 where ΔθADJ=0 [deg]. FIG. 13 shows a change in G when Δγ is changed in change locus 74 where ΔθADJ=30 [deg].

In FIGS. 12 and 13, it is shown that in a range of about Δγ<−20 [dB], about 0>G>−1 [dB] is satisfied, and a reduction amount of bias is small, but the bias does not increase. This means that when estimated error ΔθADJ of the phase rotation amount is less than 90 [deg], γ estimated small can reduce the bias, though the effect is small. In FIG. 12, since α≈α0 when Δγ≈0 [dB], G<−20 [dB] is satisfied, and the influence of the leakage of the sum signal into the difference signal can be almost completely removed. In FIG. 13, when Δγ≈−1 [dB], a minimum value is obtained at G=−6 [dB]. In FIG. 13, the bias can also be reduced. When Δγ>0 is satisfied, G increases with an inclination larger than that in the case where Δγ<0 is satisfied. In FIG. 12, G<0 is satisfied in a range of Δγ<6 [dB]. This means that when |α|<2·|α0| is satisfied, ERR3A exists inside of effective correction range 72 where |ERR3A|/|SUM3|<|α0| is satisfied.

In FIG. 13, G<0 is satisfied in a range of Δγ<4.8 [dB]. This means that in FIG. 11, a length of a portion of change locus 74 existing inside effective correction range 72 is shorter than that of change locus 73. From FIGS. 12 and 13, it can be seen that when error ΔθADJ of the phase rotation amount is about 30 [deg] or less, when γ is estimated to be less than $10^{(4.8/20)}=1.73$ times of actual value γ0, the bias of the orientation direction error can be reduced. In a case where γ is set to the value calculated based on the complex difference signal measured in the state where the difference signal is not inputted, an expected value of an improvement effect represented by G is considered to be substantially maximum.

In order to obtain the complex sum signal and the complex difference signal of digital values, conversion into the digital values may be performed after the quadrature detection.

The foregoing applies to other embodiments.

Second Embodiment

Figure 14:
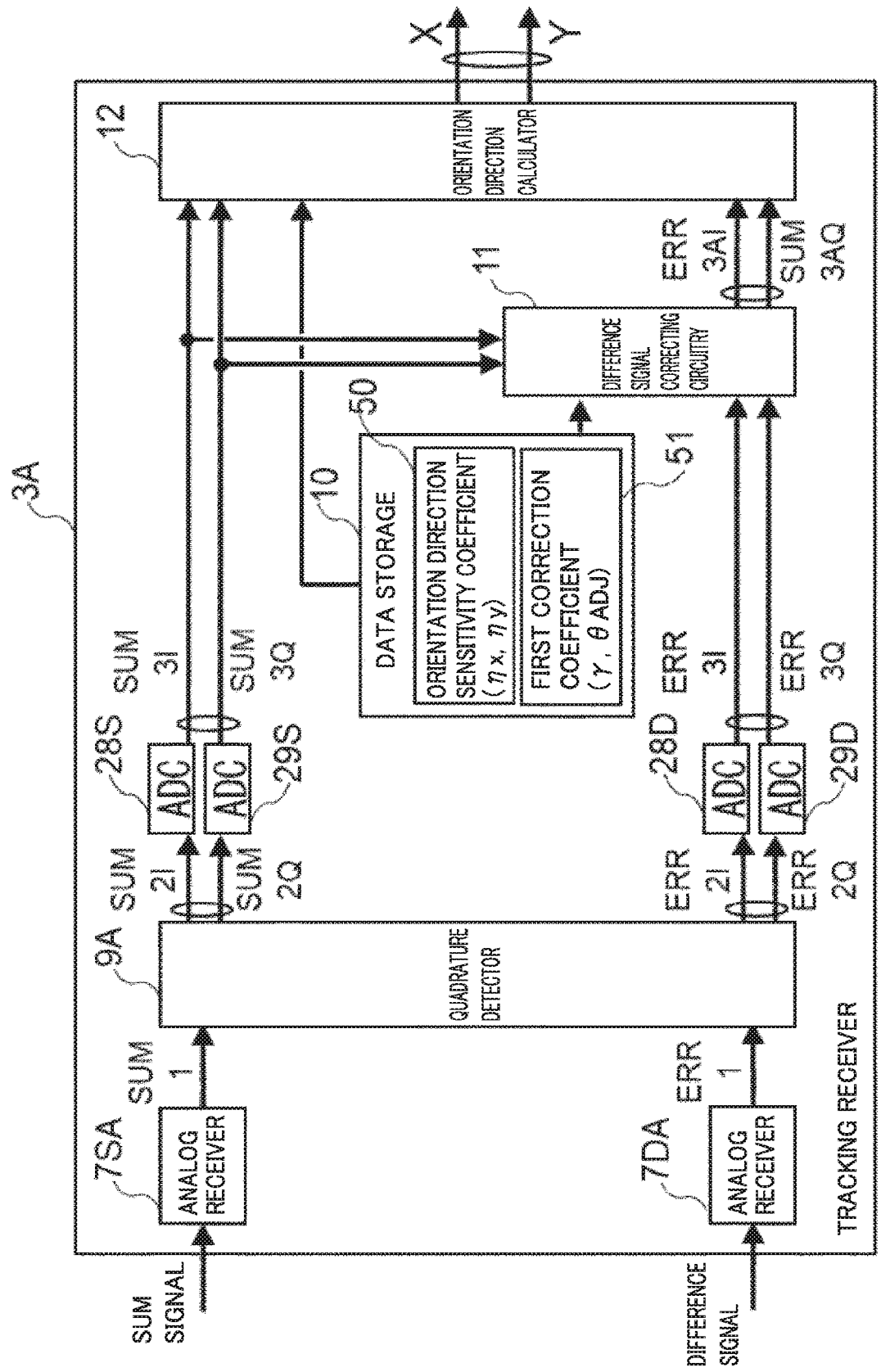
FIG. 14 is a block diagram illustrating a configuration of a tracking receiver according to a second embodiment of the present disclosure.

A second embodiment is a case where the quadrature detection is performed using an RF signal and then the conversion into a digital value is performed. FIG. 14 is a block diagram illustrating a configuration of a tracking receiver according to the second embodiment of the present disclosure. A tracking receiver 3A includes analog receivers 7SA, 7DA, a quadrature detector 9A, four A/D converters 28S, 28D, 29S, 29D, data storage 10, difference signal correcting circuitry 11, and orientation direction calculator 12. Data storage 10, difference signal correcting circuitry 11, and orientation direction calculator 12 are the same as those in the first embodiment. In FIG. 14, as compared with FIG. 2 in the case of the first embodiment, quadrature detector 9A is different in that it is located between analog receivers 7SA, 7DA and A/D converters 28S, 28D, 29S, 29D. Quadrature detector 9A performs quadrature detection to analog signals. The RF signal is inputted to tracking receiver 3A. Therefore, receiving circuitry 2A (not shown) does not include a frequency converter for converting the RF signal into an IF signal.

Figure 15A:
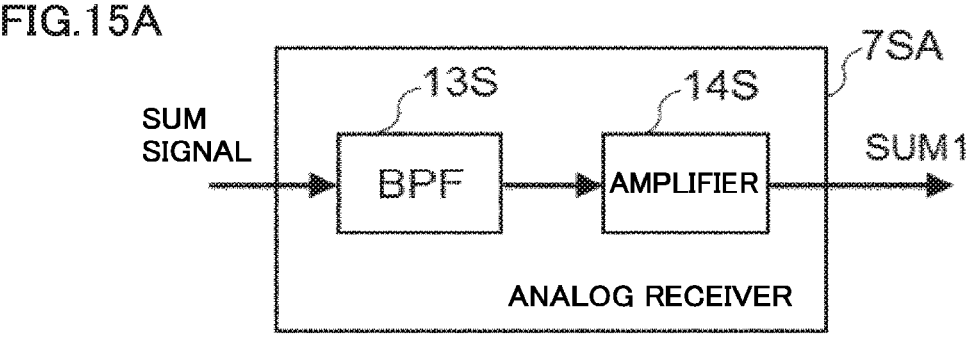
FIGS. 15A and 15B are block diagrams illustrating configurations of analog receivers included in the tracking receiver according to the second embodiment.
Figure 15B:
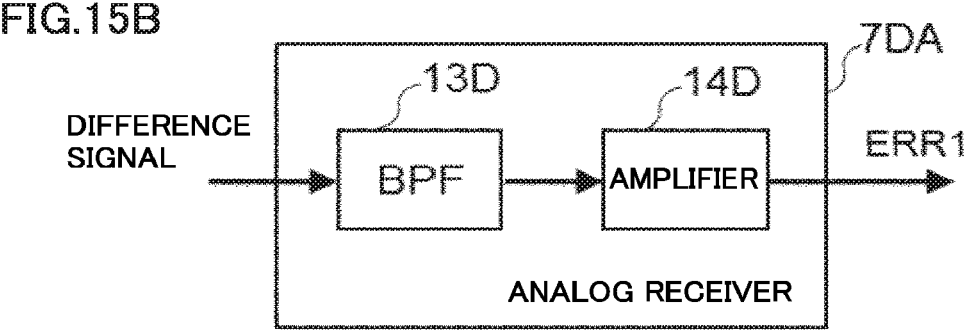

Referring to FIGS. 15A and 15B, configurations of analog receivers 7SA, 7DA are described. FIGS. 15A and 15B are block diagrams illustrating the configurations of the analog receivers included in the tracking receiver according to the second embodiment. Analog receiver 7SA that processes a sum signal includes BPF 13S and amplifier 14S. The configuration shown in FIG. 15A is different from the configuration shown in FIG. 3A in the case of the first embodiment in that analog receiver 7SA does not include LPF 15S. As shown in FIG. 14, output of quadrature detector 9A is inputted to A/D converters 28S, 28D, 29S, 29D. Therefore, processing for preventing aliasing noise from being generated by conversion from the analog value to the digital value is performed by quadrature detector 9A.

BPF13S removes noise and spurious from the sum signal in an RF band. Amplifier 14S amplifies the sum signal outputted from BPF 13S to a required signal level. The signal outputted from the amplifier 14S is an output signal of analog receiver 7SA. The sum signal outputted from analog receiver 7SA is denoted as SUM1.

Analog receiver 7DA that processes a difference signal includes BPF 13D and amplifier 14D as with analog receiver 7SA. BPF 13D and amplifier 14D are connected in series. BPF13D removes noise and spurious from the difference signal in the RF band. An amplification factor of amplifier 14S is inputted to amplifier 14D, and amplifier 14D amplifies the difference signal with the same amplification factor as that of amplifier 14S. The difference signal outputted from analog receiver 7DA is denoted as ERR1.

Figure 16:
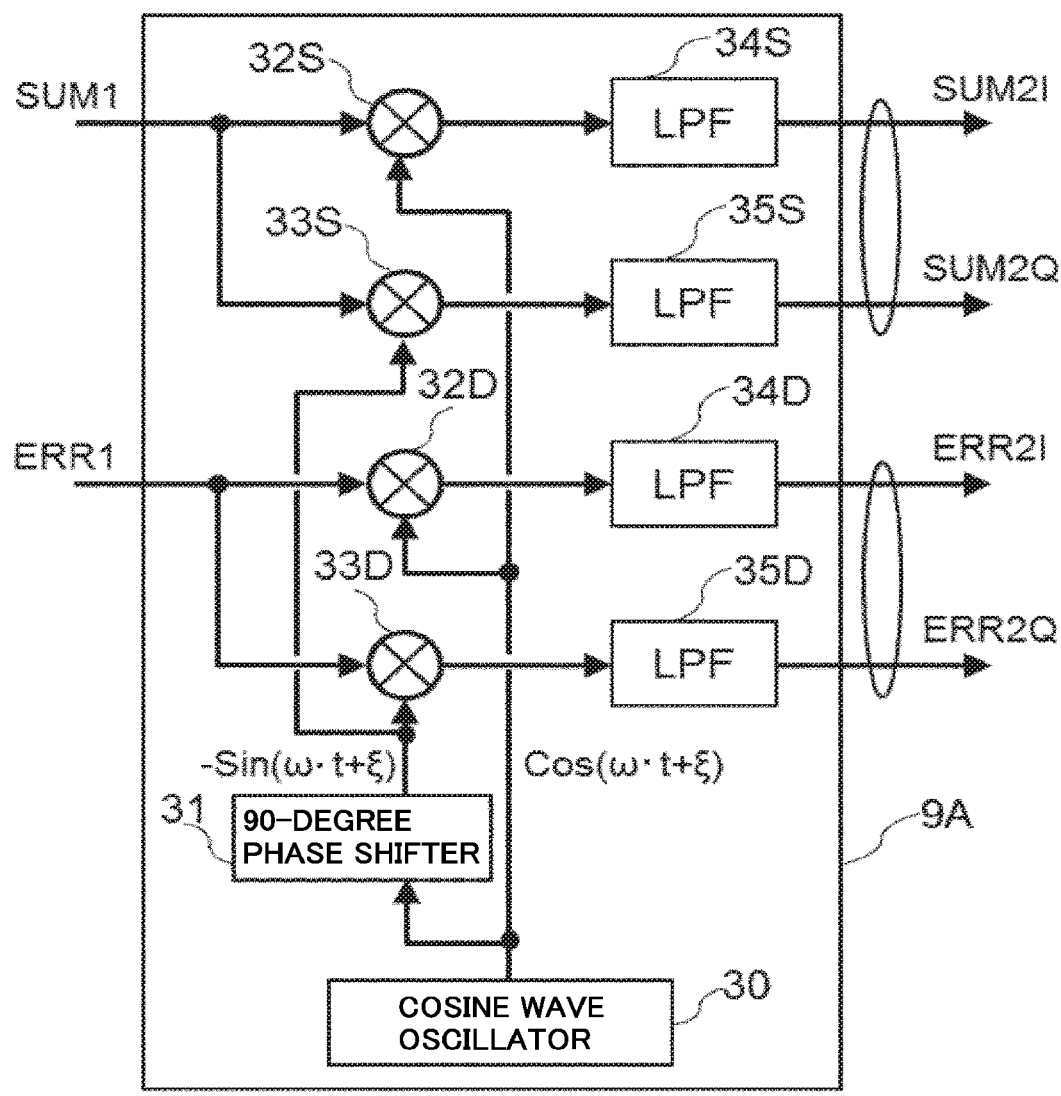
FIG. 16 is a block diagram illustrating a configuration of a quadrature detector included in the tracking receiver according to the second embodiment.

A configuration of quadrature detector 9A is described with reference to FIG. 16. FIG. 16 is a block diagram illustrating the configuration of the quadrature detector included in the tracking receiver according to the second embodiment. Quadrature detector 9A includes a cosine wave oscillator 30, a 90-degree phase shifter 31, four mixers 32S, 32D, 33S, 33D, and four LPFs 34S, 34D, 35S, 35D. Cosine wave oscillator 30 outputs an analog signal having a frequency (an angular velocity is ω) that is a difference between a frequency of the RF signal and a frequency of a BB signal or a sum thereof. The signal outputted from cosine wave oscillator 30 is divided into two, and one is inputted to 90-degree phase shifter 31. 90-degree phase shifter 31 outputs a signal obtained by advancing a phase of the inputted signal by 90 degrees. For example, when a signal of cos θ is inputted, 90-degree phase shifter 31 outputs a signal of −sin θ. Here, the signal outputted from cosine wave oscillator 30 is represented by cos (ω·t+ξ), and the signal outputted from 90-degree phase shifter 31 is represented by −sin (ω·t+ξ).

Mixer 32S multiplies sum signal SUM1 and signal cos (ω·t+ξ) outputted from cosine wave oscillator 30 as an analog signal. The signal outputted from mixer 32S is inputted to LPF 34S. LPF 34S removes a high-frequency component from the output signal of mixer 32S and outputs an I component SUM2I of a complex sum signal SUM2 of the BB signal. Mixer 33S multiplies sum signal SUM1 and signal −sin (ω·t+ξ) outputted from 90-degree phase shifter 31 as an analog signals. The signal outputted from mixer 33S is inputted to LPF 35S. LPF 35S outputs a Q component SUM2Q of complex sum signal SUM2 in a BB band.

Mixer 32D multiplies difference signal ERR1 and signal cos (ω·t+ξ) outputted from cosine wave oscillator 30 as an analog signal. The signal outputted from mixer 32D is inputted to LPF 34D. LPF 34D removes a high-frequency component from the output signal of mixer 32D and outputs an I component ERR2I of complex difference signal ERR2 of the BB signal. Mixer 33D multiplies difference signal ERR1 and signal −sin (ω·t+ξ) outputted from 90-degree phase shifter 31 as an analog signal. The signal outputted from mixer 33D is inputted to LPF 35D. LPF 35D outputs a Q component ERR2Q of complex difference signal ERR2 in the BB band.

A/D converters 28S, 29S convert sum signal SUM2 of the analog signal outputted from the LPFs 34S, 35S into a digital value and output complex sum signal SUM3. A/D converter 28S outputs I component SUM3I of complex sum signal SUM3. A/D converter 29S outputs Q component SUM3Q of complex sum signal SUM3.

A/D converters 28D, 29D convert difference signal ERR2 of the analog signal outputted from LPFs 34D, 35D into a digital value, and output complex difference signal ERR3. A/D converter 28D outputs I component ERR3I of complex difference signal ERR3. A/D converter 29D outputs Q component ERR3Q of complex difference signal ERR3.

Quadrature detector 9A and A/D converters 28S, 29S constitute the complex sum signal generator to generate the complex sum signal by performing the quadrature detection to the sum signal outputted from the antenna, and then converting the resultant of performing the quadrature detection into the digital value. Strictly speaking, in quadrature detector 9A, cosine wave oscillator 30, 90-degree phase shifter 31, mixers 32S, 33S, and LPFs 34S, 35S constitute the complex sum signal generator.

Quadrature detector 9A and A/D converters 28D, 29D constitute the complex difference signal generator to generate the complex difference signal by performing the quadrature detection to the difference signal outputted from the antenna, and then converting the resultant of performing the quadrature detection into the digital value. Strictly speaking, in quadrature detector 9A, cosine wave oscillator 30, 90-degree phase shifter 31, mixers 32D, 33D, and LPFs 34D, 35D constitute the complex difference signal generator.

Operation is described. Antenna 1 receives a radio wave, and outputs the sum signal and the difference signal. The sum signal and the difference signal are inputted to tracking receiver 3A. Complex sum signal SUM3 is calculated by digitizing a resultant of performing the quadrature detection to the sum signal. Complex difference signal ERR3 is calculated by digitizing a resultant of performing the quadrature detection to the difference signal. Difference signal correcting circuitry 11 and orientation direction calculator 12 operate similarly to the case of the first embodiment.

A tracking method in the second embodiment is similar to the tracking method in the first embodiment. However, in the generating complex sum signal, the complex sum signal is generated by performing the quadrature detection to the sum signal and then converting the resultant of performing the quadrature detection into the digital value. In the generating complex difference signal, the complex different signal is generated by performing the quadrature detection to the difference signal and then converting the resultant of performing the quadrature detection into the digital value.

In tracking receiver 3A, the bias of the orientation direction error generated by leakage of the sum signal into the difference signal can also be reduced. That is, when the orientation direction of the antenna tracks the arrival direction of the radio wave, deterioration of tracking accuracy can be reduced.

The RF signal may be converted into the IF signal inside the tracking receiver, and the IF signal may be converted into a digital value and then subjected to the quadrature detection as in the first embodiment. The IF signal may be subjected to the quadrature detection, and then converted into the digital value.

Third Embodiment

A third embodiment is a case where the complex difference signal and the complex sum signal are corrected in consideration of a fact that the difference signal also leaks into the sum signal. Interference between the sum signal and the difference signal can be performed bi-directionally. When the orientation direction error is large and the difference signal is large, the bias of the orientation direction error can be more accurately removed by considering the leakage of the difference signal into the sum signal.

Figure 17:
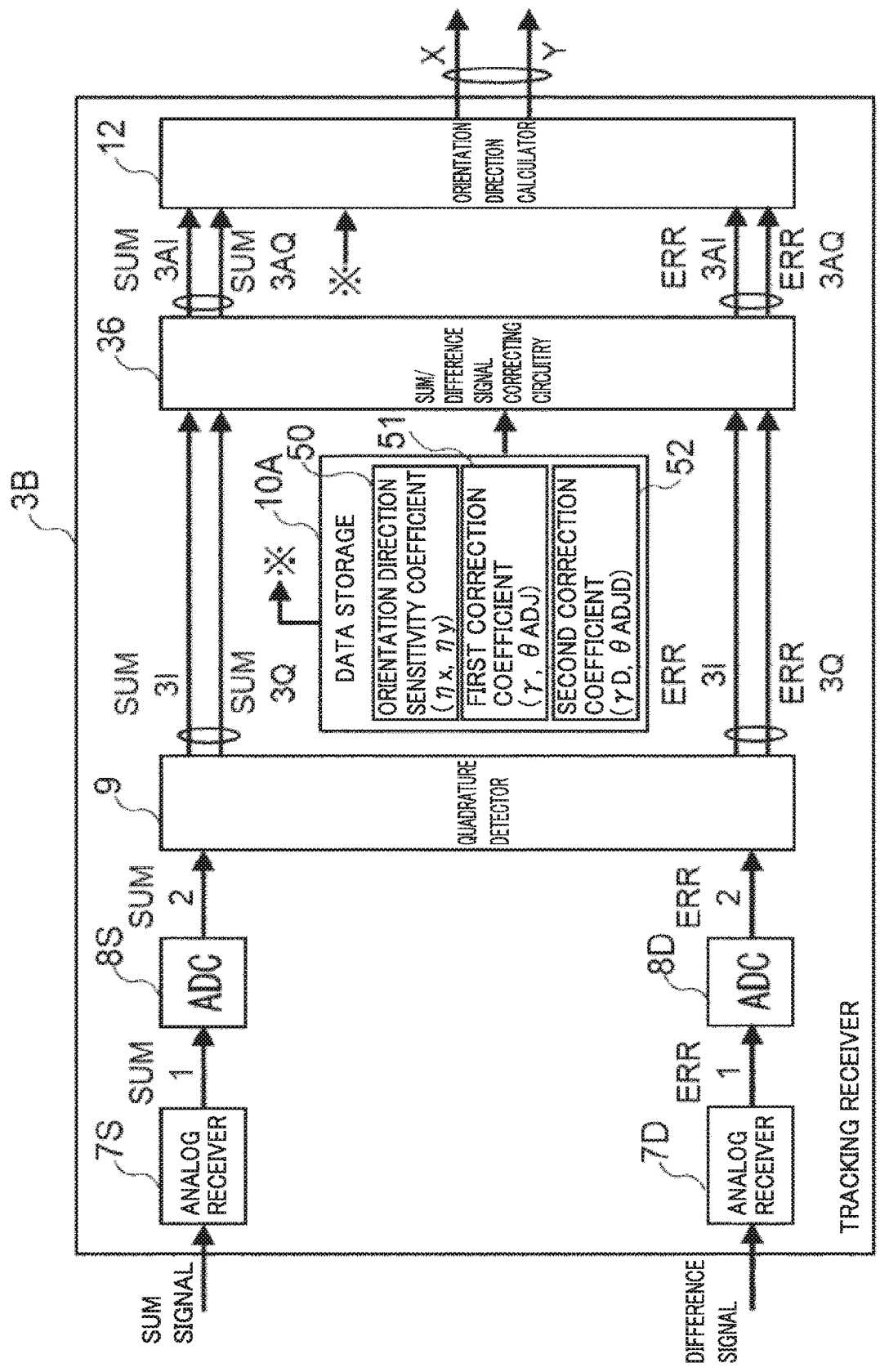
FIG. 17 is a block diagram illustrating a configuration of a tracking receiver according to a third embodiment of the present disclosure.

FIG. 17 is a block diagram illustrating a configuration of a tracking receiver according to the third embodiment of the present disclosure. Referring to FIG. 17, points different from FIG. 2 in the case of the first embodiment are described. A tracking receiver 3B includes sum/difference signal correcting circuitry 36 and does not include difference signal correcting circuitry 11. Data storage 10 is changed to a data storage 10A. Data storage 10A stores orientation direction sensitivity coefficient 50, first correction coefficient 51, and a second correction coefficient 52. First correction coefficient 51, second correction coefficient 52, complex sum signal SUM3, and complex difference signal ERR3 are inputted to sum/difference signal correcting circuitry 36. Sum/difference signal correcting circuitry 36 outputs a corrected complex sum signal SUM3A obtained by correcting complex sum signal SUM3, and corrected complex difference signal ERR3A obtained by correcting complex difference signal ERR3.

First correction coefficient 51 and second correction coefficient 52 stored in data storage 10A are represented by the following variables. First correction coefficient 51 and second correction coefficient 52 are each represented by a complex number.

α: a complex number representing first correction coefficient 51.

CS: an amplitude of α. $CS=|\alpha|$

γS: a logarithmic value of amplitude CS. $\gamma S=20 \cdot \log_{10} CS$. $CS=10^{(\gamma S/20)}$.

θADJS: a phase of α [rad]. $\alpha=CS \cdot \exp(j\theta ADJS)$

β: a complex number representing second correction coefficient 52.

CD: an amplitude of β. $CD=|\beta|$

γD: a logarithmic value of amplitude CD. $\gamma D=20 \cdot \log_{10} CD$. $CD=10^{(\gamma D/20)}$.

θADJD: a phase of β [rad]. $\beta=CD \cdot \exp(j\theta ADJD)$

Here, complex numbers α, β are represented in polar coordinates. Complex numbers α, β may be represented in rectangular coordinates.

A method for obtaining first correction coefficient 51 and second correction coefficient 52 is described. Similar to FIG. 7, an orientation direction error ZD is calculated in a case where only the sum signal is inputted by connecting the termination resistor to the input terminal of the difference signal of conventional tracking receiver 3X. An orientation direction error ZS is calculated in a case where only the difference signal is inputted by connecting a termination resistor to an input terminal of the sum signal of tracking receiver 3X.

ZD: a complex number obtained by dividing complex difference signal ERR3 by generated complex sum signal SUM3 in the case where only the sum signal is inputted by connecting the termination resistor to the input terminal of the difference signal.

ZS: a complex number obtained by dividing complex sum signal SUM3 by generated complex difference signal ERR3 in the case where only the difference signal is inputted by connecting the termination resistor to the input terminal of the sum signal.

Although a derivation process is omitted, first correction coefficient α and second correction coefficient β are calculated by ZD and ZS in the following equations.

$$\alpha = ZD \cdot (1+ZS)/(1-ZD \cdot ZS) \tag{18}$$

$$\beta = ZS \cdot (1+ZD)/(1-ZD \cdot ZS) \tag{19}$$

First correction coefficient α and second correction coefficient β are each a complex number calculated based on the complex sum signal and the complex difference signal generated in the state where the sum signal is inputted to the tracking receiver without inputting the difference signal, and the complex sum signal and the complex difference signal generated in the state where the difference signal is inputted to the tracking receiver without inputting the sum signal.

First correction coefficient α and second correction coefficient β may be determined so that a square error is minimized based on sets of the complex sum signal and the complex difference signal each generated in each of a plurality of states where both the sum signal and the difference signal are inputted to the tracking receiver. Only first correction coefficient α may be determined so that the square error is minimized. As long as first correction coefficient α and second correction coefficient β are determined so that the amount of the leakage of the sum signal into the difference signal and the amount of the leakage of the difference signal into the sum signal in the analog circuit portion can be accurately estimated, any method may be used.

Figure 18:
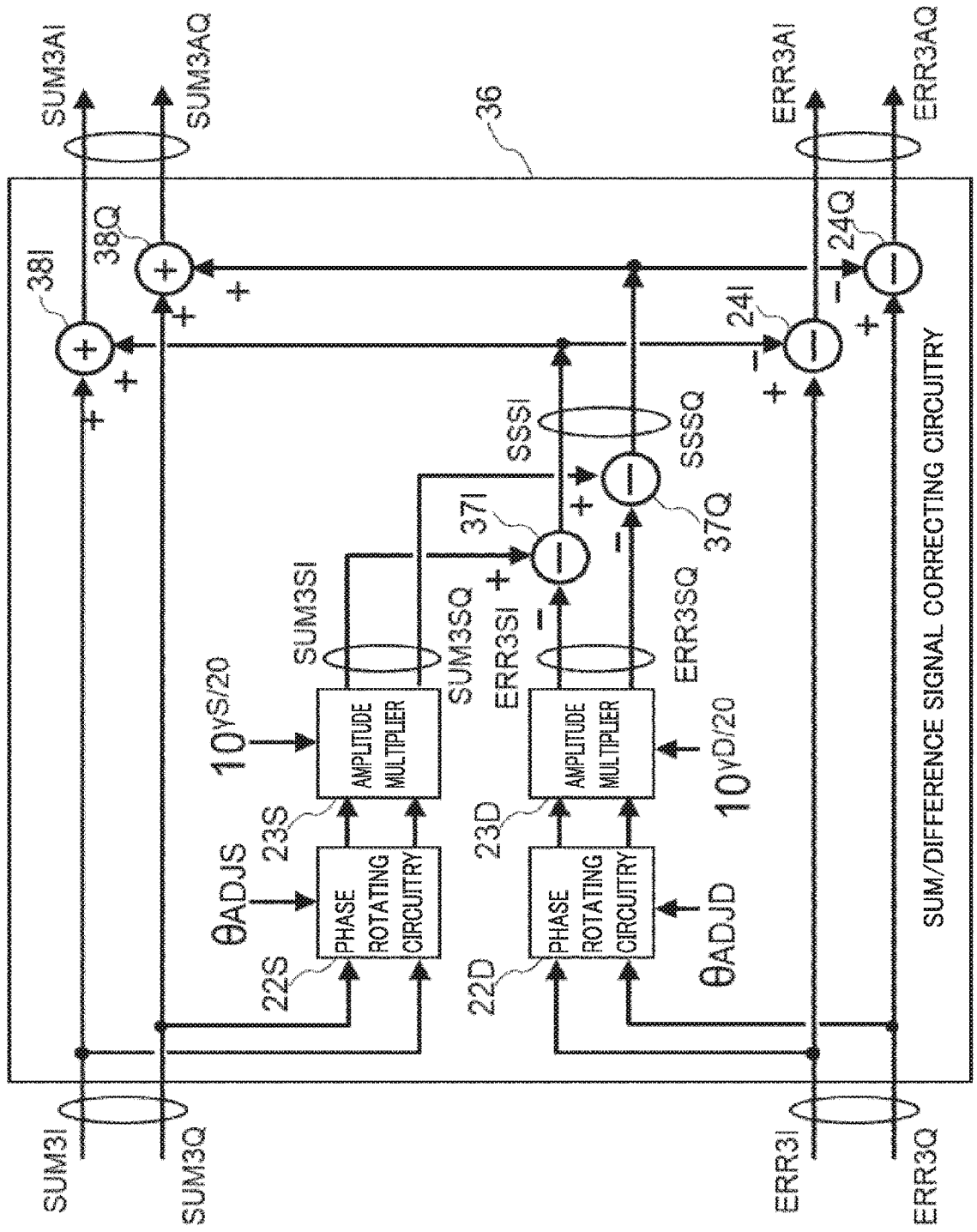
FIG. 18 is a block diagram illustrating a configuration of sum/difference signal correcting circuitry included in the tracking receiver according to the third embodiment.

A configuration of sum/difference signal correcting circuitry 36 is described with reference to FIG. 18. FIG. 18 is a block diagram illustrating the configuration of the sum/difference signal correcting circuitry included in the tracking receiver according to the third embodiment. Sum/difference signal correcting circuitry 36 includes phase rotating circuitry 22S, 22D, amplitude multipliers 23S, 23D, subtractors 37I, 37Q, subtractors 24I, 24Q, and adders 38I, 38Q. Phase rotating circuitry 22S rotates the phase of complex sum signal SUM3 by θADJS. Amplitude multiplier 23S multiplies an amplitude of a signal outputted from phase rotating circuitry 22S by CS and makes the amplitude of the signal to be CS times. The output of amplitude multiplier 23S is referred to as an estimated leakage sum signal SUM3S=SUM3SI+jSUM3SQ. That is, estimated leakage sum signal SUM3S is calculated by the following equation.

SUM3S=α·SUM3

$$= 10^{(\gamma S/20)} \cdot \exp(j\theta ADJS) \cdot SUM3 \tag{20}$$

Phase rotating circuitry 22D rotates a phase of complex difference signal ERR3 by θADJD. Amplitude multiplier 23D multiplies an amplitude of a signal outputted from phase rotating circuitry 22D by CD and makes the amplitude of the signal to be CD times. The output of amplitude multiplier 23D is referred to as an estimated leakage difference signal ERR3S=ERR3SI+jERR3SQ. That is, estimated leakage difference signal ERR3S is calculated by the following equation.

ERR3S=β·ERR3

$$= 10^{(\gamma D/20)} \cdot \exp(j\theta ADJD) \cdot ERR3 \tag{21}$$

A complex number obtained by subtracting estimated leakage difference signal ERR3S from estimated leakage sum signal SUM3S is referred to as an estimated net leakage signal SSS=SSSI+jSSSQ. Subtractors 37I, 37Q calculate estimated net leakage signal SSS. Subtractor 37I subtracts an I component ERR3SI of estimated leakage difference signal ERR3S from an I component SUM3SI of estimated leakage sum signal SUM3S. Subtractor 37Q subtracts a Q component ERR3SQ of estimated leakage difference signal ERR3S from a Q component SUM3SQ of estimated leakage sum signal SUM3S. That is, estimated net leakage signal SSS is calculated by the following equations.

SSS=SUM3S−ERR3S $$=\alpha \cdot SUM3 - \beta \cdot ERR3 \tag{22}$$

$$SSSI = SUM3SI - ERR3SI \tag{23}$$

$$SSSQ = SUM3SQ - ERR3SQ \tag{24}$$

Corrected complex difference signal ERR3A is calculated by subtracting estimated net leakage signal SSS from complex difference signal ERR3. Subtractors 24I, 24Q are provided to calculate corrected complex difference signal ERR3A. Subtractor 24I subtracts an I component SSSI of estimated net leakage signal SSS from I component ERR3I of complex difference signal ERR3. Output of the subtractor 24I is an I component ERR3AI of corrected complex difference signal ERR3A. Subtractor 24Q subtracts a Q component SSSQ of estimated net leakage signal SSS from Q component ERR3Q of complex difference signal ERR3. Output of subtractor 24Q is a Q component ERR3AQ of corrected complex difference signal ERR3A. That is, corrected complex difference signal ERR3A is calculated by the following equations.

$$ERR3A = ERR3 - SSS \tag{25}$$

$$ERR3AI = ERR3I - SSSI \tag{26}$$

$$ERR3AQ = ERR3Q - SSSQ \tag{27}$$

By adding estimated net leakage signal SSS to complex sum signal SUM3, corrected complex sum signal SUM3A is calculated. Adders 38I, 38Q are provided to calculate corrected complex sum signal SUM3A. Adder 38I adds I component SSSI of estimated net leakage signal SSS to I component SUM3I of complex sum signal SUM3. Output of adder 38I is an I component SUM3AI of corrected complex sum signal SUM3A. Adder 38Q adds Q component SSSQ of estimated net leakage signal SSS to Q component SUM3Q of complex difference signal SUM3. Output of adder 38Q is a Q component SUM3AQ of corrected complex sum signal SUM3A. That is, corrected complex sum signal SUM3A is calculated by the following equations.

$$SUM3A = SUM3 + SSS \tag{28}$$

$$SUM3AI = SUM3I + SSSI \tag{29}$$

$$SUM3AQ = SUM3Q + SSSQ \tag{30}$$

Corrected complex difference signal ERR3A may be calculated, without calculating estimated net leakage signal SSS, by subtracting estimated leakage sum signal SUM3S from complex difference signal ERR3 and adding estimated leakage difference signal ERR3S. That is, corrected complex difference signal ERR3A may be calculated by the following equations.

$$ERR3A = ERR3 - SUM3S + ERR3S$$

$$= ERR3 - \alpha \cdot SUM3 + \beta \cdot ERR3 \quad (25A)$$

$$ERR3AI = ERR3I - SUM3SI + ERR3SI \quad (26A)$$

$$ERR3AQ = ERR3Q - SUM3SQ + ERR3SQ \quad (27A)$$

Corrected complex sum signal SUM3A may be calculated by subtracting estimated leakage difference signal ERR3S from complex sum signal SUM3 and adding estimated leakage sum signal SUM3S. That is, corrected complex sum signal SUM3A may be calculated by the following equations.

$$SUM3A = SUM3 + SUM3S - ERR3S$$

$$= SUM3 + \alpha \cdot SUM3 - \beta \cdot ERR3 \quad (28A)$$

$$SUM3AI = SUM3I + SUM3SI - ERR3SI \quad (29A)$$

$$SUM3AQ = SUM3Q + SUM3SQ - ERR3SQ \quad (30A)$$

Sum/difference signal correcting circuitry 36 is complex difference signal correcting circuitry to calculate corrected complex difference signal ERR3A by correcting complex difference signal ERR3 based on complex sum signal SUM3, first correction coefficient $\alpha$, and second correction coefficient $\beta$. Sum/difference signal correcting circuitry 36 is also complex sum signal correcting circuitry to calculate corrected complex sum signal SUM3A by correcting complex sum signal SUM3 based on complex difference signal ERR3, first correction coefficient $\alpha$, and second correction coefficient $\beta$.

Sum/difference signal correcting circuitry 36 is complex difference signal correcting circuitry to calculate corrected complex difference signal ERR3A by subtracting, from complex difference signal ERR3 by estimated leakage sum signal SUM3S, and adding estimated leakage difference signal ERR3S. Estimated leakage sum signal SUM3S is obtained by multiplying complex sum signal SUM3 by first correction coefficient $\alpha$, and estimated leakage difference signal ERR3S is obtained by multiplying complex difference signal ERR3 by second correction coefficient $\beta$. Sum/difference signal correcting circuitry 36 is complex sum signal correcting circuitry to calculate corrected complex sum signal SUM3A by adding estimated leakage sum signal SUM3S to complex sum signal SUM3, and subtracting estimated leakage difference signal ERR3S.

Orientation direction calculator 12 calculates a normalized complex difference signal ERR4=ERR3A/SUM3A by performing complex division to corrected complex difference signal ERR3A, by corrected complex sum signal SUM3A. Orientation direction error X+jY is calculated by multiplying ERR4 by orientation direction sensitivity coefficients $\eta x$, $\eta y$. That is, orientation direction error X+jY is calculated by the following equation.

$$X+jY = \eta x \cdot Re[ERR4] + j\eta y \cdot Im[ERR4]$$

$$= \eta x \cdot Re[(ERR3A/SUM3A)] + j\eta y \cdot Im[(ERR3A/SUM3A)] \quad (31)$$

Operation is described. The sum signal and the difference signal are inputted to tracking receiver 3B. By digitizing the sum signal and performing the quadrature detection, complex sum signal SUM3 is calculated. By digitizing the difference signal and performing the quadrature detection, complex difference signal ERR3 is calculated. Sum/difference signal correcting circuitry 36 calculates estimated net leakage signal SSS. Sum/difference signal correcting circuitry 36 calculates corrected complex difference signal ERR3A by subtracting estimated net leakage signal SSS from complex difference signal ERR3. Sum/difference signal correcting circuitry 36 calculates corrected complex sum signal SUM3A by adding the estimated net leakage signal SSS to complex sum signal SUM3. Orientation direction calculator 12 calculates orientation direction error X+jY by performing complex division to corrected complex difference signal ERR3A, by corrected complex sum signal SUM3A, and further multiplying orientation direction sensitivity coefficients $\eta x$, $\eta y$. Controlling circuitry 6 controls antenna driving device 5 so that orientation direction error X+jY approaches zero.

Sum/difference signal correcting circuitry 36 estimates both the sum signal leaking into complex difference signal ERR3 and the difference signal leaking into complex sum signal SUM3, and estimates the net leakage signal between the sum signal and the difference signal. The complex sum signal and the complex difference signal are corrected by the estimated net leakage signal. Therefore, when the difference signal is large, the bias of the orientation direction error due to the influence of signal leakage between the sum signal and the difference signal can be reduced. That is, when the orientation direction of the antenna tracks the arrival direction of the radio wave, deterioration of tracking accuracy can be reduced.

Fourth Embodiment

A fourth embodiment is a case where the first embodiment is modified so as to correct the complex difference signal in consideration of the fact that the difference signal also leaks into the sum signal. Generally, the sum signal is 10 or more times as large as the difference signal. Therefore, when the leakage of the sum signal into the difference signal and the leakage of the difference signal to the sum signal are considered, it is possible to remove the bias of the orientation direction error with considerably high accuracy. While the accuracy in the fourth embodiment may be slightly lower than that in the third embodiment, a configuration is simpler.

Figure 19:
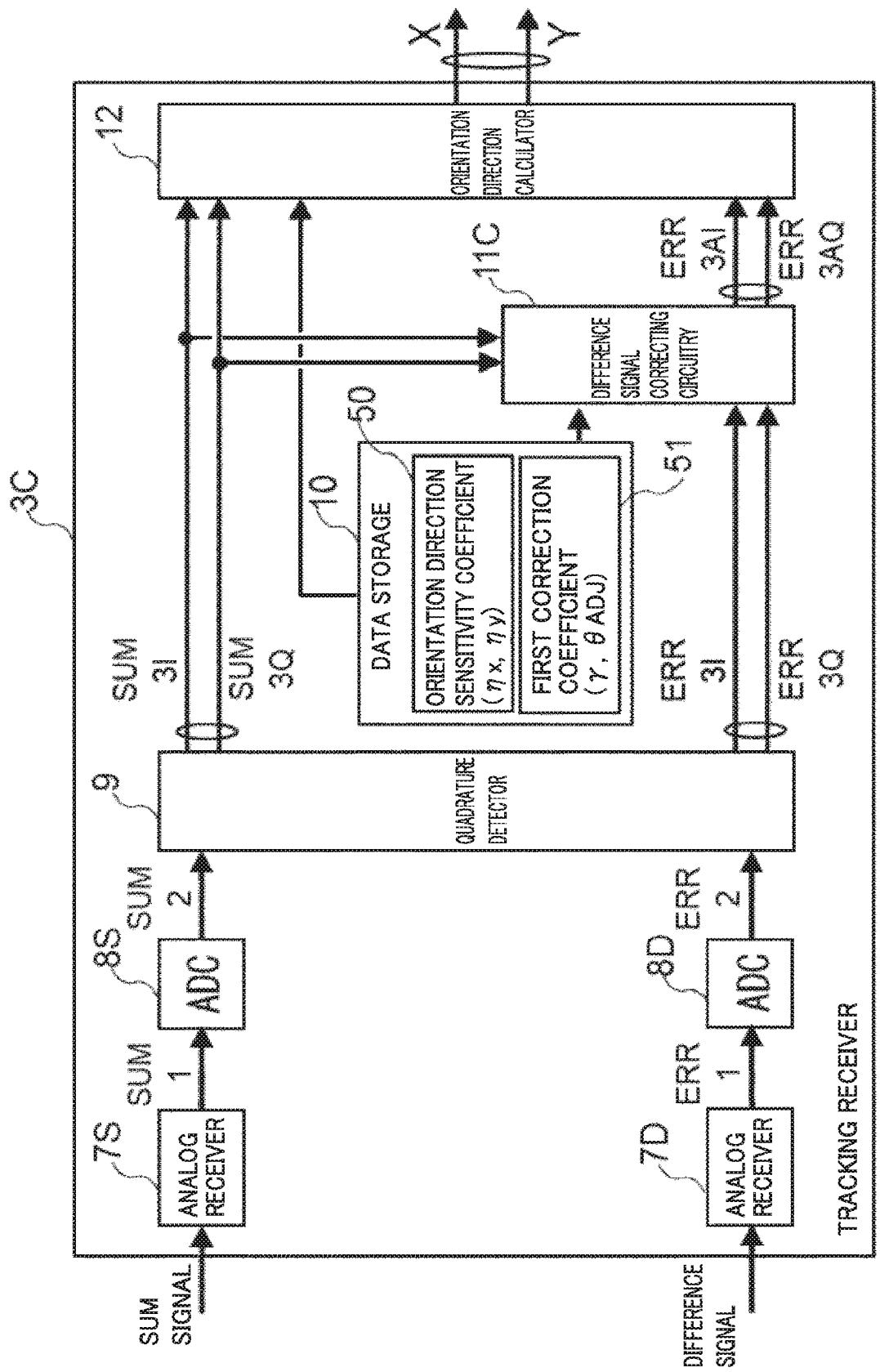
FIG. 19 is a block diagram illustrating a configuration of a tracking receiver according to a fourth embodiment of the present disclosure.

FIG. 19 is a block diagram illustrating a configuration of a tracking receiver according to the fourth embodiment of the present disclosure. Comparing FIG. 19 with FIG. 2 in the case of the first embodiment, the one difference is that a tracking receiver 3C includes difference signal correcting circuitry 11C instead of difference signal correcting circuitry 11. Referring to FIG. 19, points different from FIG. 17 in the third embodiment are described. Tracking receiver 3C includes difference signal correcting circuitry 11C instead of sum/difference signal correcting circuitry 36. Tracking receiver 3C includes data storage 10 instead of data storage 10A. Data storage 10 stores orientation direction sensitivity coefficient 50 and first correction coefficient 51. First correction coefficient 51, complex sum signal SUM3, and complex difference signal ERR3 are inputted to difference signal correcting circuitry 11C. Difference signal correcting circuitry 11C outputs corrected complex difference signal ERR3A obtained by correcting complex difference signal ERR3.

Figure 20:
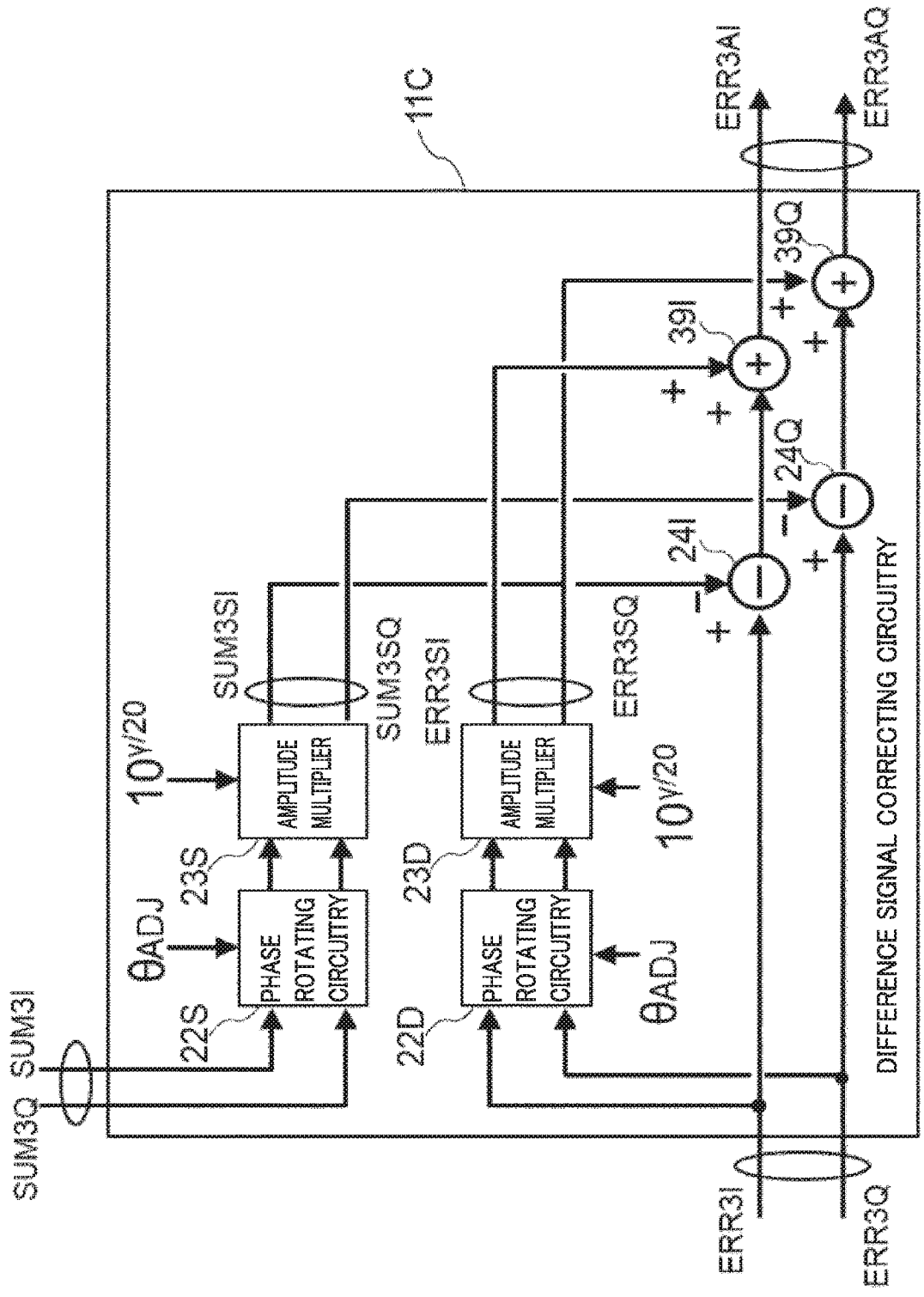
FIG. 20 is a block diagram illustrating a configuration of difference signal correcting circuitry included in the tracking receiver according to the fourth embodiment.

FIG. 20 is a block diagram illustrating a configuration of the difference signal correcting circuitry included in the tracking receiver according to the fourth embodiment. Referring to FIG. 20, points different from FIG. 5 in the case of the first embodiment are described. Reference signs of phase rotating circuitry 22 and amplitude multiplier 23 are changed to a phase rotating circuitry 22S and an amplitude multiplier 23S. Phase rotating circuitry 22S and amplitude multiplier 23S calculate estimated leakage sum signal SUM3S from complex sum signal SUM3.

In order to calculate estimated leakage difference signal ERR3S from complex difference signal ERR3, phase rotating circuitry 22D and amplitude multiplier 23D are added. Phase rotating circuitry 22D rotates the phase of complex difference signal ERR3 by θADJ. That is, complex difference signal ERR3 is multiplied by exp(jθADJ). Amplitude multiplier 23D multiplies the amplitude of complex difference signal ERR3 by $C=10^{\gamma/20}$. Phase rotating circuitry 22D and amplitude multiplier 23D calculate estimated leakage difference signal ERR3S by the following equations. The equation for calculating estimated leakage sum signal SUM3S, which is described before, is also described.

$$ERR3S = \alpha \cdot ERR3$$

$$= 10^{(\gamma/20)} \cdot \exp(j\theta ADJ) \cdot ERR3 \quad (32)$$

$$SUM3S = \alpha \cdot SUM3$$

$$= 10^{(\gamma/20)} \cdot \exp(j\theta ADJ) \cdot SUM3 \quad (3)$$

In order to add estimated leakage difference signal ERR3S to the complex difference signal, adders 39I, 39Q are added. By subtractors 24I, 24Q and adders 39I, 39Q, complex difference signal ERR3 is corrected by the following equations (25B) to (27B), and corrected difference signal ERR3A is calculated.

$$ERR3A = ERR3 - SUM3S + ERR3S$$

$$= ERR3 - \alpha \cdot SUM3 + \alpha \cdot ERR3 \quad (25B)$$

$$ERR3AI = ERR3I - SUM3SI + ERR3SI \quad (26B)$$

$$ERR3AQ = ERR3Q - SUM3SQ + ERR3SQ \quad (27B)$$

Orientation direction calculator 12 calculates a normalized complex difference signal ERR4=ERR3A/SUM3 by performing complex division to corrected complex difference signal ERR3A, by complex sum signal SUM3. Orientation direction error X+jY is calculated by multiplying ERR4 by orientation direction sensitivity coefficients ηx, ηy.

Operation is described. Antenna 1 receives a radio wave, and outputs the sum signal and the difference signal. The sum signal and the difference signal are inputted to tracking receiver 3C. By digitizing the sum signal and performing the quadrature detection, complex sum signal SUM3 is calculated. By digitizing the difference signal and performing the quadrature detection, complex difference signal ERR3 is calculated. Difference signal correcting circuitry 11C calculates estimated leakage sum signal SUM3S and estimated leakage difference signal ERR3S. Difference signal correcting circuitry 11C calculates corrected complex difference signal ERR3A by subtracting estimated leakage sum signal SUM3S from complex difference signal ERR3 and adding estimated leakage difference signal ERR3S. Orientation direction calculator 12 calculates orientation direction error X+jY by performing complex division to corrected complex difference signal ERR3A, by complex sum signal SUM3, and further multiplying orientation direction sensitivity coefficients ηx, ηy. Controlling circuitry 6 controls antenna driving device 5 so that orientation direction error X+jY approaches zero.

In tracking receiver 3C, the bias of the orientation direction error due to the leakage of the sum signal into the difference signal and the leakage of the difference signal to the sum signal can be reduced. That is, when the orientation direction of the antenna tracks the arrival direction of the radio wave, deterioration of tracking accuracy can be reduced.

As compared with the third embodiment, the configuration is simpler because the number of the subtractors is smaller by two. Since the second correction coefficient is not used, labor for preparing the correction coefficient is also reduced. The sum signal is larger than the difference signal, and it is considered that sufficient accuracy can be obtained without considering the leakage of the difference signal into the sum signal and the leakage from the sum signal to the difference signal.

Fifth Embodiment

A fifth embodiment is a case where the fourth embodiment is modified so as to use the first correction coefficient and the second correction coefficient. The first correction coefficient is used when the leakage of the sum signal into the difference signal is estimated. The second correction coefficient is used when the leakage of the difference signal to the sum signal is estimated. In the fifth embodiment, the use of the second correction coefficient enables the bias of the orientation direction error to be removed with higher accuracy than that in the fourth embodiment.

Figure 21:
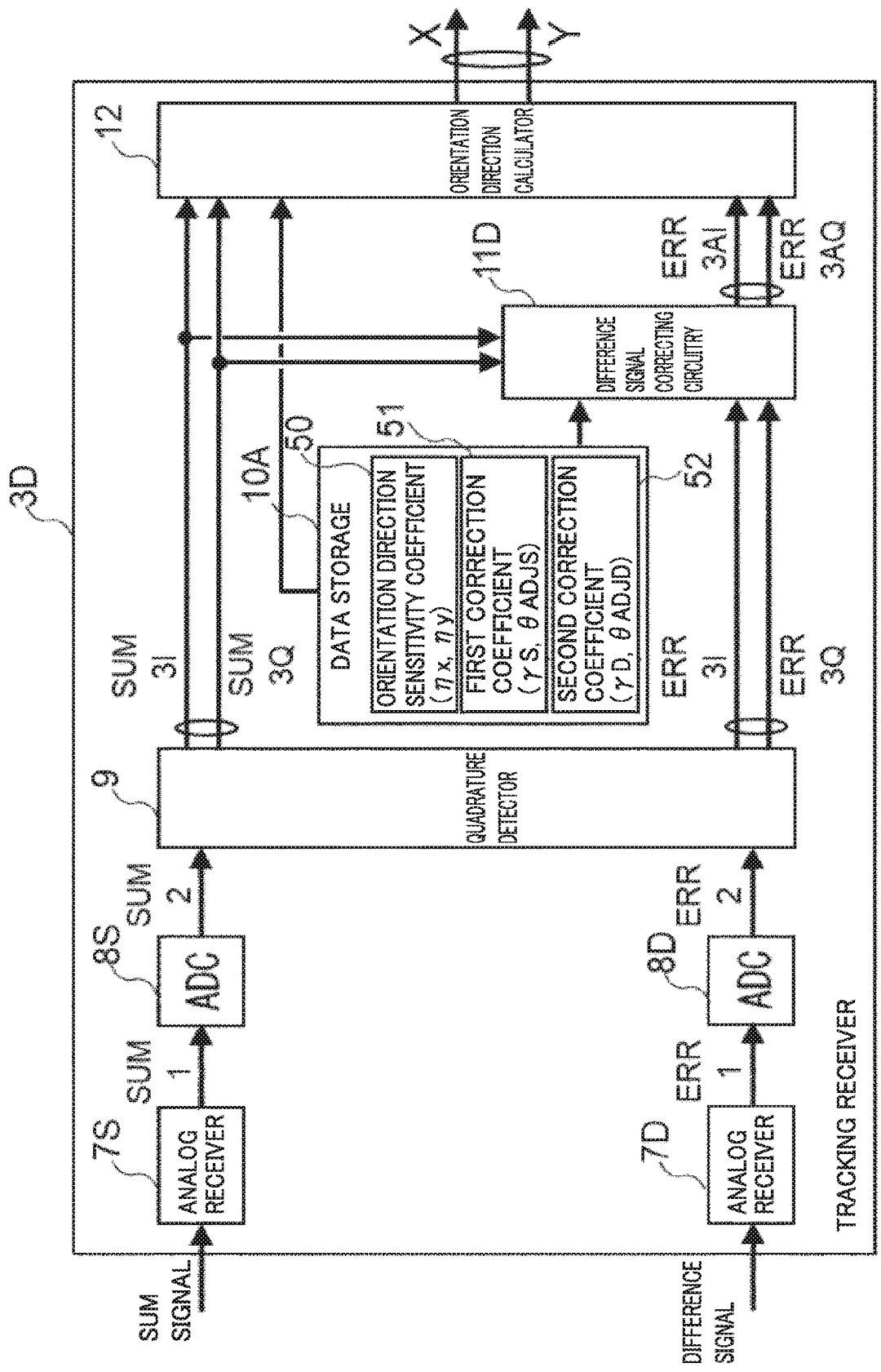
FIG. 21 is a block diagram illustrating a configuration of a tracking receiver according to a fifth embodiment of the present disclosure.

FIG. 21 is a block diagram illustrating a configuration of a tracking receiver according to the fifth embodiment of the present disclosure. Referring to FIG. 21, points different from FIG. 19 in the case of the fourth embodiment are described. In a tracking receiver 3D, data storage 10 is changed to data storage 10A, and difference signal correcting circuitry 11C is changed to difference signal correcting circuitry 11D. Data storage 10A stores second correction coefficient 52 in addition to orientation direction sensitivity coefficient 50 and first correction coefficient 51. First correction coefficient 51, second correction coefficient 52, complex sum signal SUM3, and complex difference signal ERR3 are inputted to difference signal correcting circuitry 11D. Difference signal correcting circuitry 11D outputs corrected complex difference signal ERR3A obtained by correcting complex difference signal ERR3.

Figure 22:
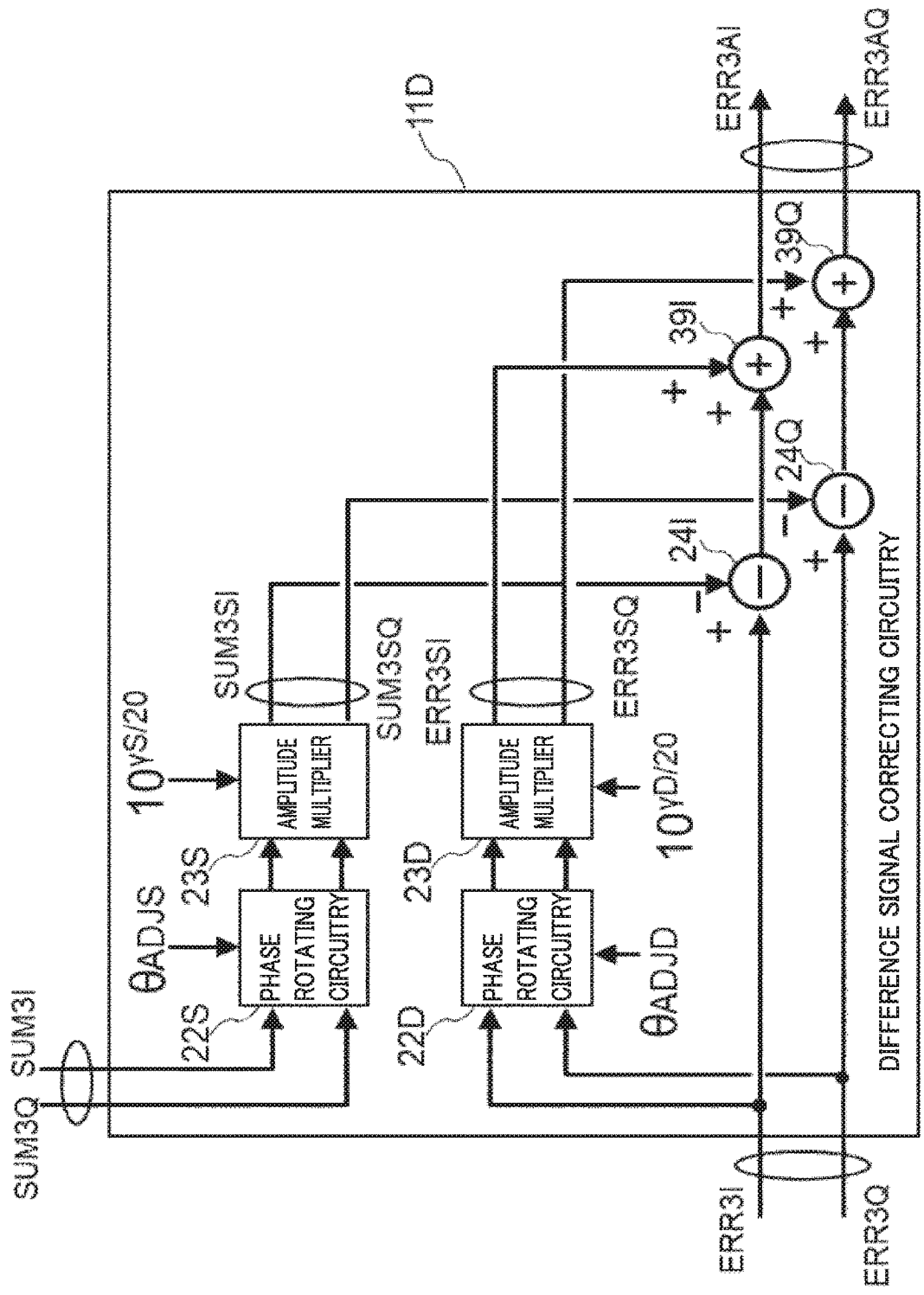
FIG. 22 is a block diagram illustrating a configuration of difference signal correcting circuitry included in the tracking receiver according to the fifth embodiment.

FIG. 22 is a block diagram illustrating a configuration of difference signal correcting circuitry included in the tracking receiver according to the fifth embodiment. Referring to FIG. 22, points different from FIG. 20 in the case of the fourth embodiment are described. Phase rotating circuitry 22S and amplitude multiplier 23S calculate estimated leakage sum signal SUM3S by multiplying complex sum signal SUM3 by first correction coefficient $\alpha = 10^{(\gamma S/20)} \cdot \exp(j\theta ADJS)$. Estimated leakage sum signal SUM3S is calculated by the following equation (20) described before.

$$SUM3S = \alpha \cdot SUM3$$

$$= 10^{(\gamma S/20)} \cdot \exp(j\theta ADJS) \cdot SUM3 \quad (20)$$

Phase rotating circuitry 22D and amplitude multiplier 23D calculate estimated leakage difference signal ERR3S by multiplying complex difference signal ERR3 by second correction coefficient $\beta = 10^{(\gamma D/20)} \cdot \exp(j\theta ADJD)$. Estimated leakage difference signal ERR3S is calculated by the following equation (21) described before.

$$ERR3S = \beta \cdot ERR3$$

$$= 10^{(\gamma D/20)} \cdot \exp(j\theta ADJD) \cdot ERR3 \qquad (21)$$

Complex difference signal ERR3 is corrected, using the following equations (25A) to (27A) described before to calculate corrected difference signal ERR3A.

$$ERR3A = ERR3 - SUM3S + ERR3S$$

$$= ERR3 - \alpha \cdot SUM3 + \beta \cdot ERR3 \qquad (25A)$$

$$ERR3AI = ERR3I - SUM3SI + ERR3SI \qquad (26A)$$

$$ERR3AQ = ERR3Q - SUM3SQ + ERR3SQ \qquad (27A)$$

Orientation direction calculator 12 calculates normalized complex difference signal ERR4=ERR3A/SUM3 by performing complex division to corrected complex difference signal ERR3A, by complex sum signal SUM3. Orientation direction error X+jY is calculated by multiplying ERR4 by orientation direction sensitivity coefficients $\eta x$, $\eta y$.

Operation is described. The fifth embodiment operates similarly to the fourth embodiment. However, difference signal correcting circuitry 11D calculates estimated leakage sum signal SUM3S, using first correction coefficient $\alpha$, and calculates estimated leakage difference signal ERR3S, using second correction coefficient $\beta$.

In tracking receiver 3D, the bias of the orientation direction error due to the leakage of the sum signal into the difference signal and the leakage of the difference signal to the sum signal can be reduced. That is, when the orientation direction of the antenna tracks the arrival direction of the radio wave, deterioration of tracking accuracy can be reduced.

The fifth embodiment is different from the fourth embodiment in that second correction coefficient $\beta$ is also used. It is considered that the use of the second correction coefficient enables the leakage of the difference signal to the sum signal to be calculated more accurately than that in the fourth embodiment.

Sixth Embodiment

A sixth embodiment is a case where the third embodiment is modified so that the second correction coefficient is not used. A modification is made so that the net leakage signal is not calculated.

Figure 23:
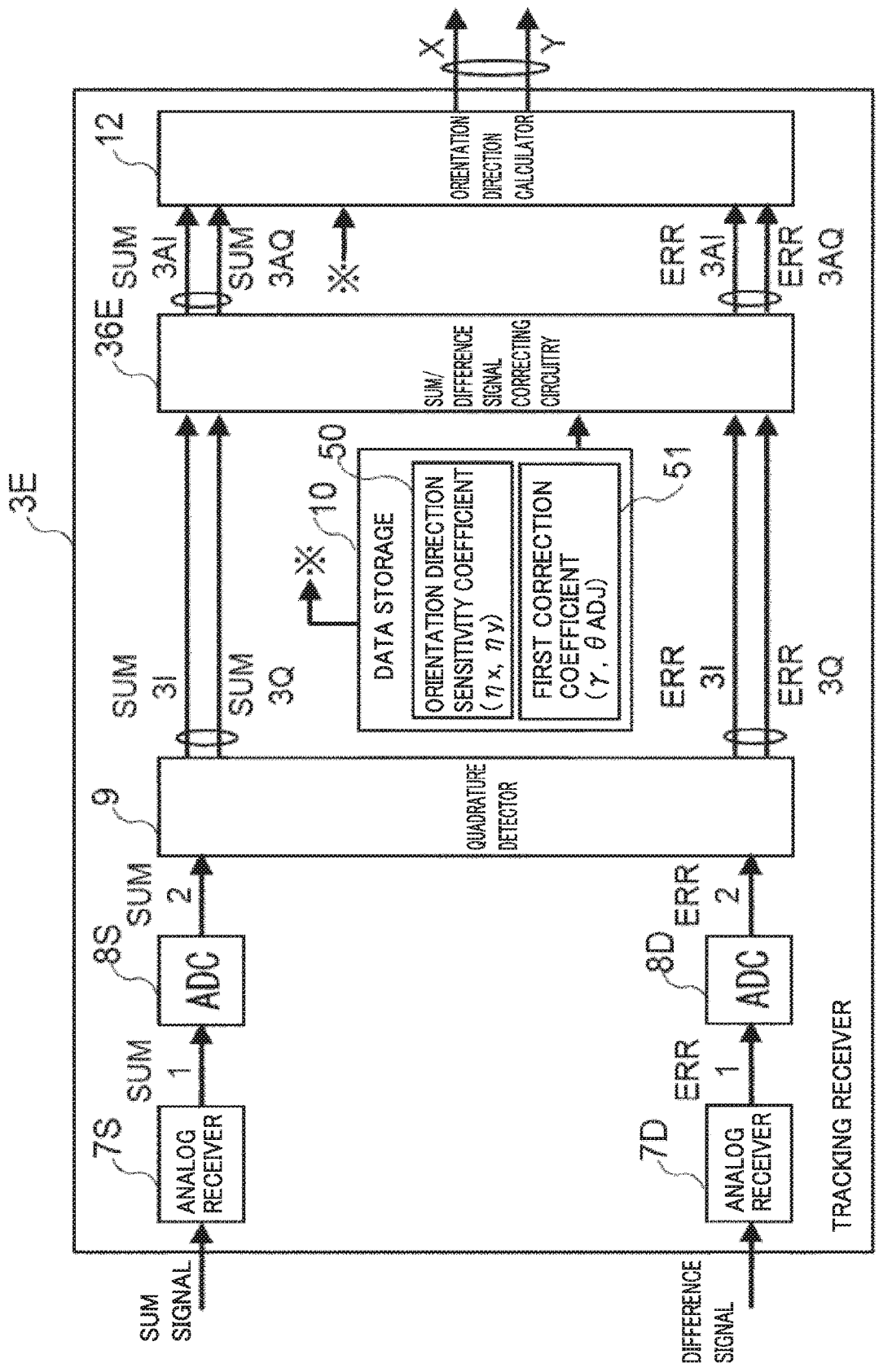
FIG. 23 is a block diagram illustrating a configuration of a tracking receiver according to a sixth embodiment of the present disclosure.

FIG. 23 is a block diagram illustrating a configuration of a tracking receiver according to the sixth embodiment of the present disclosure. Referring to FIG. 23, points different from FIG. 17 in the case of the third embodiment are described. In a tracking receiver 3E, data storage 10A is changed to data storage 10, and sum/difference signal correcting circuitry 36 is changed to sum/difference signal correcting circuitry 36E. Data storage 10 stores orientation direction sensitivity coefficient 50 and first correction coefficient 51. First correction coefficient 51, complex sum signal SUM3, and complex difference signal ERR3 are inputted to sum/difference signal correcting circuitry 36E. Sum/difference signal correcting circuitry 36E outputs corrected complex difference signal ERR3A obtained by correcting complex difference signal ERR3, and outputs corrected complex sum signal SUM3A obtained by correcting complex sum signal SUM3.

Figure 24:
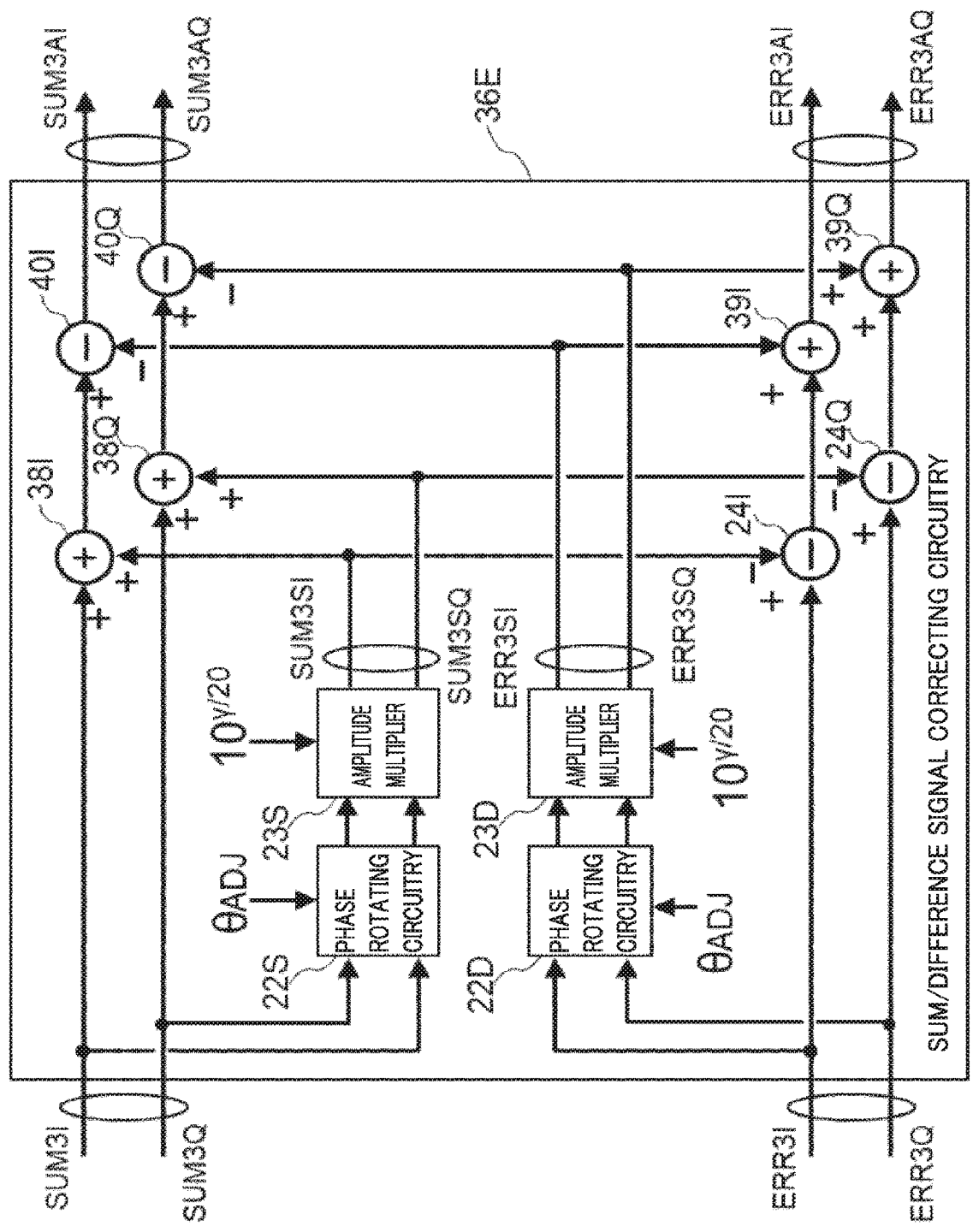
FIG. 24 is a block diagram illustrating a configuration of sum/difference signal correcting circuitry included in the tracking receiver according to the sixth embodiment.

FIG. 24 is a block diagram illustrating a configuration of the sum/difference signal correcting circuitry included in the tracking receiver according to the sixth embodiment. Referring to FIG. 24, points different from FIG. 18 in the case of the third embodiment are described. Phase rotating circuitry 22S and amplitude multiplier 23S calculates estimated leakage sum signal SUM3S by multiplying complex sum signal SUM3 by first correction coefficient $\alpha = 10^{(\gamma/20)} \cdot \exp(j\theta ADJ)$. Estimated leakage sum signal SUM3S is calculated by the following equation (3) described before.

$$SUM3S = \alpha \cdot SUM3$$

$$= 10^{(\gamma/20)} \cdot \exp(j\theta ADJ) \cdot SUM3 \qquad (3)$$

Phase rotating circuitry 22D and amplitude multiplier 23D calculate estimated leakage difference signal ERR3S by multiplying complex difference signal ERR3 by first correction coefficient $\alpha = 10^{(\gamma/20)} \cdot \exp(j\theta ADJ)$. Estimated leakage difference signal ERR3S is calculated by the following equation (32) described before.

$$ERR3S = \alpha \cdot ERR3$$

$$= 10^{(\gamma/20)} \cdot \exp(j\theta ADJ) \cdot ERR3 \qquad (32)$$

Corrected difference signal ERR3A is calculated by subtracting estimated leakage sum signal SUM3S from complex difference signal ERR3 and adding estimated leakage difference signal ERR3S without calculating net leakage signal SSS. Corrected difference signal ERR3A is calculated, using the following equations (25B) to (27B) described before.

$$ERR3A = ERR3 - SUM3S + ERR3S$$

$$= ERR3 + \alpha \cdot SUM3 + \alpha \cdot ERR3 \qquad (25B)$$

$$ERR3AI = ERR3I - SUM3SI + ERR3SI \qquad (26B)$$

$$ERR3AQ = ERR3Q - SUM3SQ + ERR3SQ \qquad (27B)$$

Corrected sum signal SUM3A is calculated by adding estimated leakage sum signal SUM3S to complex sum signal SUM3 and subtracting estimated leakage difference signal ERR3S. Corrected sum signal SUM3A is calculated, using the following equations (28B) to (30B).

$$SUM3A = SUM3 + SUM3S - ERR3S$$

$$= SUM3 + \alpha \cdot SUM3 - \alpha \cdot ERR3 \qquad (28B)$$

$$SUM3AI = SUM3I + SUM3SI - ERR3SI \qquad (29B)$$

$$SUM3AQ = SUM3Q + SUM3SQ - ERR3SQ \qquad (30B)$$

Estimated leakage sum signal SUM3S is subtracted from complex difference signal ERR3 by subtractors 24I, 24Q. Estimated leakage difference signal ERR3S is added to complex difference signal ERR3 by adders 39I, 39Q. Estimated leakage difference signal ERR3S is subtracted from complex sum signal SUM3 by subtractors 40I, 40Q. Estimated leakage sum signal SUM3S is added to complex sum signal SUM3 by adders 38I, 38Q.

Orientation direction calculator 12 calculates normalized complex difference signal ERR4=ERR3A/SUM3A by performing complex division to corrected complex difference signal ERR3A, using corrected complex sum signal SUM3A. Orientation direction error X+jY is calculated by multiplying ERR4 by orientation direction sensitivity coefficients $\eta x$, $\eta y$.

Operation is described. The sixth embodiment operates similarly to the third embodiment, and substantially the same effects can be obtained. Since only the first correction coefficient is used, the configuration is slightly simpler than that in the case of the third embodiment. Since the occurrence of the leakage of the sum signal into the difference signal and the occurrence of the leakage of the difference signal into the sum signal are considered to be at the similar level, it can be assumed that the first correction coefficient and the second correction coefficient are not significantly different. Therefore, an influence of using the first correction coefficient instead of the second correction coefficient is considered to be small.

In the sixth embodiment, the bias of the orientation direction error can be reduced with almost the same accuracy as in the third embodiment. That is, when the orientation direction of the antenna tracks the arrival direction of the radio wave, deterioration of tracking accuracy can be reduced.

Seventh Embodiment

A seventh embodiment is a case where the sixth embodiment is modified so that the estimated leakage difference signal is not added to the complex difference signal and the estimated leakage sum signal is not added to the complex sum signal. This is because the analog receiver amplifies the sum signal to a predetermined signal strength, so that it is considered that the estimated leakage sum signal leaking from the sum signal need not to be compensated for.

Figure 25:
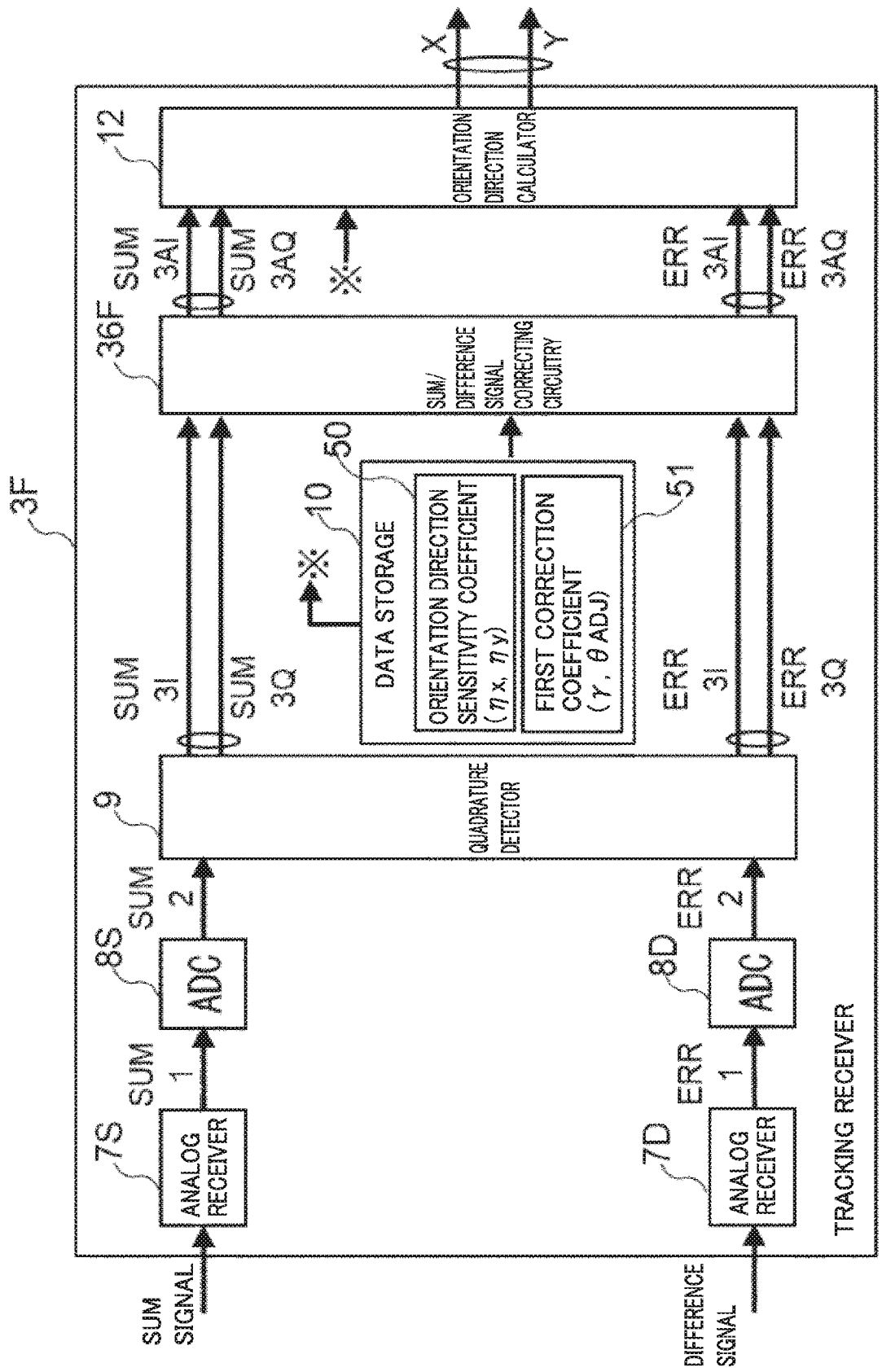
FIG. 25 is a block diagram illustrating a configuration of a tracking receiver according to a seventh embodiment of the present disclosure.

FIG. 25 is a block diagram illustrating a configuration of a tracking receiver according to the seventh embodiment of the present disclosure. Referring to FIG. 25, points different from FIG. 23 in the case of the sixth embodiment are described. In a tracking receiver 3F, sum/difference signal correcting circuitry 36E is changed to sum/difference signal correcting circuitry 36F.

Figure 26:
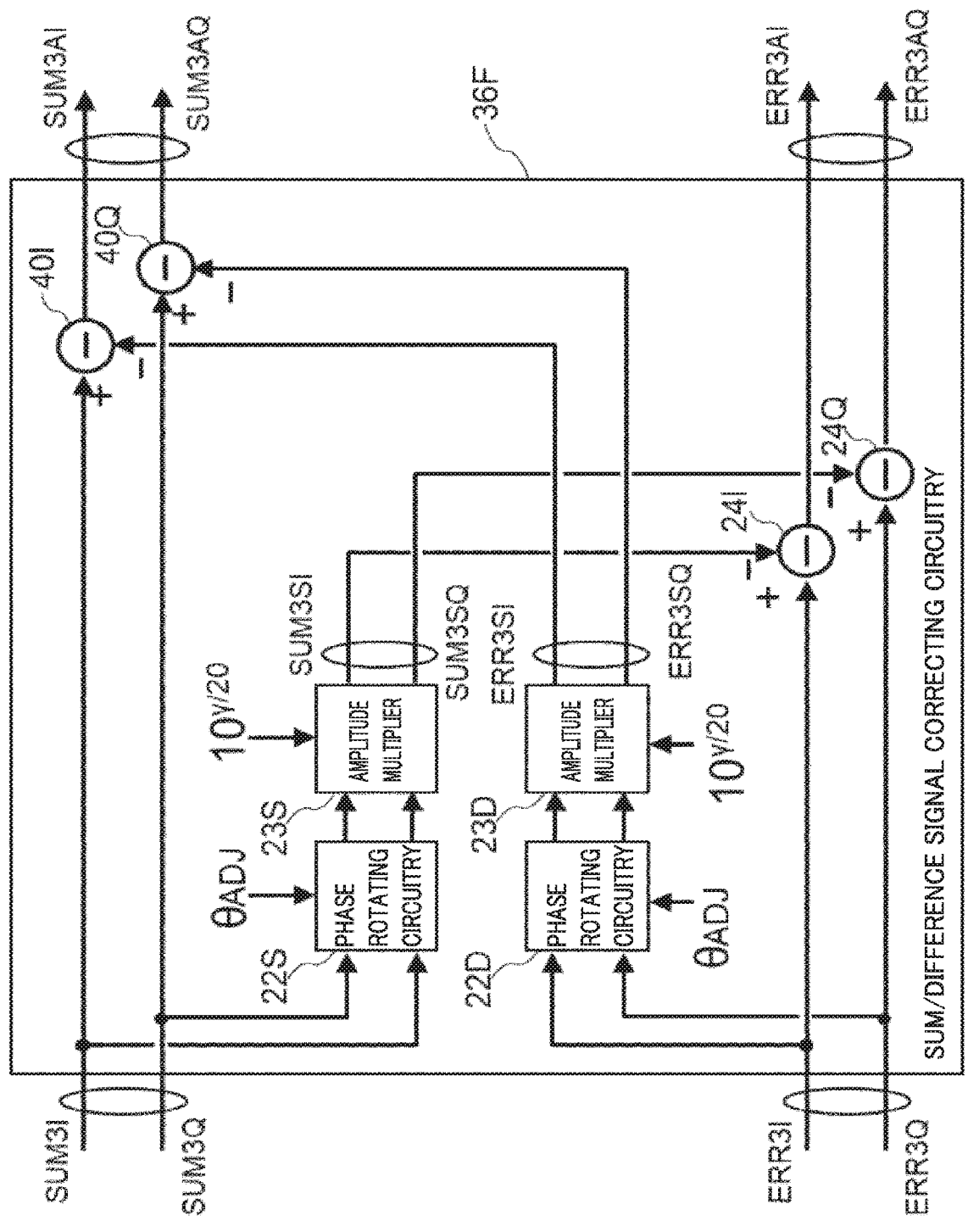
FIG. 26 is a block diagram illustrating a configuration of sum/difference signal correcting circuitry included in the tracking receiver according to the seventh embodiment.

FIG. 26 is a block diagram illustrating a configuration of difference signal correcting circuitry included in the tracking receiver according to the seventh embodiment. Referring to FIG. 26, points different from FIG. 24 in the case of the sixth embodiment are described. Sum/difference signal correcting circuitry 36F does not include adders 38I, 38Q, 39I, 39Q.

Sum/difference signal correcting circuitry 36F calculates corrected complex difference signal ERR3A by subtracting estimated leakage sum signal SUM3S from complex difference signal ERR3. Subtractors 24I, 24Q are provided to calculate corrected complex difference signal ERR3A. That is, corrected complex difference signal ERR3A is calculated by the following equations.

$$ERR3A = ERR3 - SUM3S$$

$$= ERR3 - \alpha \cdot SUM3 \quad (33)$$

$$ERR3AI = ERR3I - SUM3SI \quad (34)$$

$$ERR3AQ = ERR3Q - SUM3SQ \quad (35)$$

Sum/difference signal correcting circuitry 36F calculates corrected complex sum signal SUM3A by adding estimated leakage difference signal ERR3S to complex sum signal SUM3. Subtractors 40I, 40Q are provided to calculate corrected complex sum signal SUM3A. That is, corrected complex difference signal ERR3A is calculated by the following equations.

$$SUM3A = SUM3 - ERR3S = SUM3 - \beta \cdot ERR3 \quad (36)$$

$$SUM3AI = SUM3I - ERR3SI \quad (37)$$

$$SUM3AQ = SUM3Q - ERR3SQ \quad (38)$$

Orientation direction calculator 12 calculates normalized complex difference signal ERR4=ERR3A/SUM3A by performing complex division to corrected complex difference signal ERR3A, by corrected complex sum signal SUM3A. Orientation direction error X+jY is calculated by multiplying ERR4 by orientation direction sensitivity coefficients ηx, ηy.

Operation is described. The seventh embodiment operates similarly to the sixth embodiment, and substantially the same effects can be obtained. The configuration is simpler than that in the sixth embodiment.

It is considered that an influence of not adding the estimated leakage difference signal to the complex difference signal and not adding the estimated leakage sum signal to the complex sum signal is small. In the seventh embodiment, the bias of the orientation direction error can be reduced. In the seventh embodiment, the reduction amount of the bias of the orientation direction error does not decrease largely compared with the sixth embodiment. That is, when the orientation direction of the antenna tracks the arrival direction of the radio wave, deterioration of tracking accuracy can be reduced.

The present disclosure allows free combinations of the embodiments, or modifications and omissions of the embodiments within the spirit of the disclosure.

REFERENCE SIGNS LIST

100: antenna apparatus, 101: communicator, 1: antenna, 2, 2A: receiving circuitry, 3, 3A, 3B, 3C, 3D, 3E, 3F, 3X: tracking receiver, 4: antenna pedestal, 5: antenna driving device, 6: controlling circuitry, 7S, 7D, 7SA, 7SD: analog receiver, 8S: A/D converter (ADC, complex sum signal generator), 8D: A/D converter (ADC, complex difference signal generator), 9, 9A: quadrature detector (complex sum signal generator, complex difference signal generator), 10: data storage (first correction coefficient storage), 10A: data storage (first correction coefficient storage, second correction coefficient storage), 10X: data storage, 11, 11C, 11D: difference signal correcting circuitry (complex difference signal correcting circuitry), 12: orientation direction calculator (orientation direction error calculator), 13S, 13D: band pass filter (BPF), 14S, 14D: amplifier, 15S, 15D: low pass filter (LPF), 16: numerically controlled oscillator (NCO), 17: cos/−sin generator, 18S, 18D, 19S, 19D: multiplier, 20S, 20D, 21S, 21D: low pass filter (LPF), 22, 22S, 22D: phase rotating circuitry, 23, 23S, 23D: amplitude multiplier, 24I, 24Q: subtractor, 25: complex division circuit, 26I, 26Q: low pass filter (LPF), 27I, 27Q: multiplier, 28S, 29S: A/D converter (ADC, complex sum signal generator), 28D, 29D: A/D converter (ADC, complex difference signal generator), 30: cosine wave oscillator, 31: 90-degree phase shifter, 32S, 32D, 33S, 33D: mixer, 34S, 34D, 35S, 35D: low pass filter (LPF), 36, 36E, 36F: sum/difference signal correcting circuitry (complex sum signal correcting circuitry, complex difference signal correcting circuitry), 37I, 37Q: subtractor, 38I, 38Q: adder, 39I, 39Q: adder, 40I, 40Q: subtractor, 50: orientation direction sensitivity coefficient, 51: first correction coefficient, 52: second correction coefficient, 71: leakage path of sum signal into difference signal, 72: effective correction range, 73, 74: change locus, SUM1: sum signal (analog signal), SUM2: sum signal, SUM3: complex sum signal (digital signal), SUM3A: corrected complex sum signal (digital signal), ERR1: difference signal (analog signal), ERR2: difference signal, ERR3: complex difference signal (digital signal), ERR3A: corrected complex difference signal (digital signal), MERR: leakage sum signal, SUM3S: estimated leakage sum signal (digital signal), ERR3S: estimated leakage difference signal (digital signal),
SSS: estimated net leakage signal (digital signal).

The invention claimed is:

1. A tracking receiver comprising:
   a complex sum signal generator to generate a complex sum signal by performing quadrature detection to a sum signal outputted from an antenna to receive a radio wave from a radio wave source and then converting a resultant of performing quadrature detection into a digital value, or by converting the sum signal into a digital value and then performing quadrature detection;
   a complex difference signal generator to generate a complex difference signal by performing quadrature detection to a difference signal outputted from the antenna and then converting a resultant of performing quadrature detection into a digital value, or by converting the difference signal into a digital value and then performing quadrature detection;
   a first correction coefficient storage to store a first correction coefficient represented by a complex number, the first correction coefficient being used when a leakage of the sum signal into the difference signal is estimated and corrected;
   complex difference signal correcting circuitry to calculate a corrected complex difference signal by correcting the complex difference signal based on the complex sum signal and the first correction coefficient; and
   an orientation direction error calculator to calculate an orientation direction error based on the corrected complex difference signal and the complex sum signal, the orientation direction error being a difference between an arrival direction and an orientation direction, the arrival direction being a direction from which the radio wave comes and arrives, the orientation direction being a direction in which the antenna is orientated.

2. The tracking receiver according to claim 1, wherein the complex difference signal correcting circuitry calculates the corrected complex difference signal by subtracting an estimated leakage sum signal from the complex difference signal, the estimated leakage sum signal being a value obtained by multiplying the complex sum signal by the first correction coefficient.

3. The tracking receiver according to claim 1, wherein the complex difference signal correcting circuitry calculates the corrected complex difference signal by subtracting an estimated leakage sum signal from the complex difference signal, and adding an estimated leakage difference signal, the estimated leakage sum signal being a value obtained by multiplying the complex sum signal by the first correction coefficient, the estimated leakage difference signal being a value obtained by multiplying the complex difference signal by the first correction coefficient.

4. The tracking receiver according to claim 1, further comprising complex sum signal correcting circuitry to calculate a corrected complex sum signal by correcting the complex sum signal based on the complex difference signal and the first correction coefficient, wherein
   the orientation direction error calculator calculates the orientation direction error based on the corrected complex difference signal and the corrected complex sum signal.

5. The tracking receiver according to claim 4, wherein the complex difference signal correcting circuitry calculates the corrected complex difference signal by subtracting an estimated leakage sum signal from the complex difference signal, the estimated leakage sum signal being a value obtained by multiplying the complex sum signal by the first correction coefficient, and the complex sum signal correcting circuitry calculates the corrected complex sum signal by adding the estimated leakage sum signal to the complex sum signal.

6. The tracking receiver according to claim 4, wherein the complex difference signal correcting circuitry calculates the corrected complex difference signal by subtracting an estimated leakage sum signal from the complex difference signal, and adding an estimated leakage difference signal, the estimated leakage sum signal being a value obtained by multiplying the complex sum signal by the first correction coefficient, the estimated leakage difference signal being a value obtained by multiplying the complex difference signal by the first correction coefficient, and
   the complex sum signal correcting circuitry calculates the corrected complex sum signal by adding the estimated leakage sum signal to the complex sum signal, and subtracting the estimated leakage difference signal.

7. The tracking receiver according to claim 1, further comprising a second correction coefficient storage to store a second correction coefficient represented by a complex number, the second correction coefficient being used when a leakage of the difference signal into the sum signal is estimated and corrected, wherein
   the complex difference signal correcting circuitry calculates the corrected complex difference signal by correcting the complex difference signal based on the complex sum signal, the first correction coefficient, and the second correction coefficient.

8. The tracking receiver according to claim 7, wherein the complex difference signal correcting circuitry calculates the corrected complex difference signal by subtracting an estimated leakage sum signal from the complex difference signal, and adding an estimated leakage difference signal, the estimated leakage sum signal being a value obtained by multiplying the complex sum signal by the first correction coefficient, the estimated leakage difference signal being a value obtained by multiplying the complex difference signal by the second correction coefficient.

9. The tracking receiver according to claim 7, further comprising complex sum signal correcting circuitry to calculate a corrected complex sum signal by correcting the complex sum signal based on the complex difference signal, the first correction coefficient, and the second correction coefficient, wherein
   the orientation direction error calculator calculates the orientation direction error based on the corrected complex difference signal and the corrected complex sum signal.

10. The tracking receiver according to claim 9, wherein the complex difference signal correcting circuitry calculates the corrected complex difference signal by subtracting an estimated leakage sum signal from the complex difference signal, and adding an estimated leakage difference signal, the estimated leakage sum signal being a value obtained by multiplying the complex sum signal by the first correction coefficient, the estimated leakage difference signal being a value obtained by multiplying the complex difference signal by the second correction coefficient, and
   the complex sum signal correcting circuitry calculates the corrected complex sum signal by adding the estimated leakage sum signal to the complex sum signal, and subtracting the estimated leakage difference signal.

11. The tracking receiver according to claim 1, wherein the first correction coefficient is a value determined based on the complex difference signal and the complex sum signal generated in a state where the sum signal is inputted without inputting the difference signal.

12. The tracking receiver according to claim 7, wherein the first correction coefficient and the second correction coefficient are values determined based on the complex difference signal and the complex sum signal generated in a state where the sum signal is inputted without inputting the difference signal, and the complex difference signal and the complex sum signal generated in a state where the difference signal is inputted without inputting the sum signal.

13. An antenna apparatus comprising:
an antenna to receive a radio wave from a radio wave source;
an antenna pedestal to support the antenna so that an orientation direction of the antenna can be changed;
an antenna driving device to change the orientation direction;
the tracking receiver according to claim 1, the tracking receiver to obtain an orientation direction error from a sum signal and a difference signal which are outputted from the antenna and inputted to the tracking receiver, the orientation direction error being a difference between the orientation direction and an arrival direction that is a direction from which the radio wave comes and arrives; and
controlling circuitry to control the antenna driving device so that the orientation direction error, being inputted to the controlling circuitry, approaches zero.

14. A tracking method comprising:
receiving a radio wave in which an antenna receives the radio wave from a radio wave source and outputs a sum signal and a difference signal;
generating a complex sum signal by performing quadrature detection to the sum signal and then converting a resultant of performing quadrature detection into a digital value, or by converting the sum signal into a digital value and then performing quadrature detection;
generating a complex difference signal by performing quadrature detection to the difference signal and then converting a resultant of performing quadrature detection into a digital value, or by converting the difference signal into a digital value and then performing quadrature detection;
correcting a complex difference signal in which a corrected complex difference signal is calculated by correcting the complex difference signal based on the complex sum signal and a first correction coefficient represented by a complex number, the first correction coefficient being used when a leakage of the sum signal into the difference signal is estimated and corrected;
calculating an orientation direction error in which an orientation direction error is calculated based on the corrected complex difference signal and the complex sum signal, the orientation direction error being a difference between an arrival direction and an orientation direction, the arrival direction being a direction from which the radio wave comes and arrives, the orientation direction being a direction in which the antenna is orientated; and
changing the orientation direction of the antenna so that the orientation direction error approaches zero.

15. The tracking method according to claim 14, further comprising correcting a complex sum signal in which a corrected complex sum signal is calculated by correcting the complex sum signal based on the complex difference signal and the first correction coefficient; wherein
the calculating orientation direction error calculates the orientation direction error based on the corrected complex difference signal and the corrected complex sum signal.

16. The tracking method according to claim 14, wherein the correcting complex difference signal calculates the corrected complex difference signal by correcting the complex difference signal based on the complex sum signal, the first correction coefficient, and a second correction coefficient represented by a complex number, the second correction coefficient being used when a leakage of the difference signal into the sum signal is estimated and corrected.

17. The tracking method according to claim 15, wherein
the correcting complex difference signal calculates the corrected complex difference signal by correcting the complex difference signal based on the complex sum signal, the first correction coefficient, and a second correction coefficient represented by a complex number, the second correction coefficient being used when a leakage of the difference signal into the sum signal is estimated and corrected, and
the correcting complex sum signal calculates the corrected complex sum signal by correcting the complex sum signal based on the complex difference signal, the first correction coefficient, and the second correction coefficient.

\* \* \* \* \*